United States Patent
Morikawa et al.

(10) Patent No.: US 8,174,721 B2
(45) Date of Patent: May 8, 2012

(54) METHOD, SYSTEM, AND APPARATUS FOR OUTPUTTING IMAGE, AND COMPUTER-READABLE STORAGE MEDIUM FOR COMPUTER PROGRAM

(75) Inventors: Takeshi Morikawa, Takarazuka (JP); Kei Shigehisa, Nishinomiya (JP); Toshimichi Iwai, Kitakatsuragi-gun (JP); Kenji Matsuhara, Kawanishi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 35 days.

(21) Appl. No.: 12/882,867

(22) Filed: Sep. 15, 2010

(65) Prior Publication Data

US 2011/0069346 A1    Mar. 24, 2011

(30) Foreign Application Priority Data

Sep. 18, 2009    (JP) .................. 2009-218033

(51) Int. Cl.
 *G06F 15/00* (2006.01)
 *G06F 3/12* (2006.01)
 *G06K 1/00* (2006.01)
(52) U.S. Cl. ...................... 358/1.15; 358/1.13
(58) Field of Classification Search ............ None
 See application file for complete search history.

(56) References Cited

U.S. PATENT DOCUMENTS

| | | |
|---|---|---|
| 2001/0029513 A1 | 10/2001 | Kuwano et al. |
| 2005/0068566 A1 | 3/2005 | Nishiguchi |
| 2007/0058178 A1 | 3/2007 | Kurihara et al. |
| 2007/0171462 A1* | 7/2007 | Shoya et al. .............. 358/1.15 |

FOREIGN PATENT DOCUMENTS

| | | |
|---|---|---|
| JP | 10-308868 | 11/1998 |
| JP | 2005-103962 | 4/2005 |
| JP | 2005-175942 | 6/2005 |
| JP | 2005-238709 | 9/2005 |
| JP | 2006-41801 | 2/2006 |
| JP | 2006-115169 | 4/2006 |
| JP | 2006-341524 | 12/2006 |
| JP | 2007-79809 | 3/2007 |
| JP | 2007-144674 | 6/2007 |
| JP | 2009-104234 | 5/2009 |
| WO | WO-2005/057907 | 6/2005 |

OTHER PUBLICATIONS

Decision to Grant a Patent dated Aug. 16, 2011, for corresponding Japanese patent application No. 2009-218033 and its English translation; 8 pages.

* cited by examiner

*Primary Examiner* — Douglas Tran
(74) *Attorney, Agent, or Firm* — Morrison & Foerster LLP

(57) ABSTRACT

A system for outputting an image includes first and second image output apparatuses. The first image output apparatus includes a display processing portion that displays an image to be outputted on electronic paper based on a first condition under which a job to output the image is executed, a conditions storing processing portion that stores, in a conditions storage, the first condition in association with a job identifier for identifying the job, and a job identifier storing processing portion that stores the job identifier in the electronic paper. The second image output apparatus includes a reading portion that reads out the job identifier from the electronic paper, an obtaining portion that obtains, from the conditions storage portion, the first condition corresponding to the job identifier thus read out, and a job execution portion that executes a whole or a part of the job based on the first condition thus obtained.

16 Claims, 34 Drawing Sheets

| MFP_ID | JOB_ID | TYPE (APPLICATION NAME) | BOX NAME | FILE NAME | EXECUTION DATE AND TIME | |
|---|---|---|---|---|---|---|
| M01 | J0001 | DOCUMENT COPY JOB | | | 2008/12/5 10:00 | RA |
| M01 | J0002 | READ DELIVERY JOB | BOX-B | REPORT.pdf | 2008/12/7 11:15 | RA |
| M01 | J0003 | PC PRINT JOB | | | 2008/12/12 14:40 | RA |
| M01 | J0004 | SCAN DELIVERY JOB | | | 2008/12/13 15:50 | RA |
| M01 | J0005 | READ COPY JOB | BOX-A | CONTROL SPECIFICATIONS.xls | 2008/12/13 16:20 | RA |
| ... | ... | ... | ... | ... | ... | |

| JOB_ID | COLOR MODE | PAPER SIZE | SINGLE-SIDED/ DOUBLE-SIDED N-IN-1 | PAPER OUTPUT MODE |
|---|---|---|---|---|
| J0001 | FULL-COLOR | A3SEF | SINGLE-SIDED, 2-IN-1 | STAPLING |
| J0003 | MONOCHROME | A4LEF | DOUBLE-SIDED, 1-IN-1 | N/A |
| J0005 | FULL-COLOR | B4SEF | SINGLE-SIDED, 1-IN-1 | PUNCH HOLE |
| J0006 | MONOCHROME | A4LEF | SINGLE-SIDED, 1-IN-1 | STAPLING |
| J0008 | MONOCHROME | B4SEF | SINGLE-SIDED, 2-IN-1 | N/A |
| ... | ... | ... | ... | ... |

| JOB_ID | COLOR MODE | RESOLUTION | FORMAT | DELIVERY DESTINATION |
|---|---|---|---|---|
| J0002 | FULL-COLOR | 200DPI | JPEG | MORI } RC |
| J0004 | MONOCHROME | 600DPI | PDF | TANI } RC |
| J0007 | MONOCHROME | 200DPI | JPEG | HAYASHI } RC |
| J0009 | FULL-COLOR | 400DPI | JPEG | TANI } RC |
| ... | ... | ... | ... | ... |

FIG. 14

| MFP ID OF IMAGE FORMING APPARATUS FOR THE OUTPUT PROCESS: | | | |
|---|---|---|---|
| SELECT COLOR: | SELECT PAPER: | SELECT SINGLE-SIDED/DOUBLE-SIDED AND N-IN-1: | PAPER OUTPUT MODE: | PREVIEW FINISHED DOCUMENT: |
| ○ MONOCHROME | ○ A4LEF | ○ SINGLE-SIDED 1-IN-1 | ○ N/A | ○ NO |
| ○ FULL-COLOR | ○ A3SEF | ○ DOUBLE-SIDED 1-IN-1 | ○ STAPLING | ○ YES |
| | ○ B4SEF | ○ SINGLE-SIDED 2-IN-1 | ○ PUNCH HOLE | |
| | | ○ DOUBLE-SIDED 2-IN-1 | | |

[PRINT] [CANCEL]

| MFP_ID | JOB_ID | TYPE (APPLICATION NAME) | BOX NAME | FILE NAME | EXECUTION DATE AND TIME | NEW JOB ID | |
|---|---|---|---|---|---|---|---|
| M01 | J0001 | DOCUMENT COPY JOB | | | 2008/12/5 10:00 | J0001_2 | RA |
| M01 | J0002 | READ DELIVERY JOB | BOX-B | REPORT.pdf | 2008/12/7 11:15 | J0002_2 | RA |
| M01 | J0003 | PC PRINT JOB | | | 2008/12/12 14:40 | | RA |
| M01 | J0004 | SCAN DELIVERY JOB | | | 2008/12/13 15:50 | | RA |
| M01 | J0005 | READ COPY JOB | BOX-A | CONTROL SPECIFICATIONS.xls | 2008/12/13 16:20 | | RA |
| M01 | J0001_2 | DOCUMENT COPY JOB | | | 2008/12/19 9:00 | | RA |
| M01 | J0002_2 | READ DELIVERY JOB | BOX-B | REPORT.pdf | 2008/12/22 11:30 | | RA |
| ... | ... | ... | ... | ... | ... | ... | |

| JOB_ID | COLOR MODE | PAPER SIZE | SINGLE-SIDED/ DOUBLE-SIDED N-IN-1 | PAPER OUTPUT MODE |
|---|---|---|---|---|
| J0001 | FULL-COLOR | A3SEF | SINGLE-SIDED, 2-IN-1 | STAPLING |
| J0003 | MONOCHROME | A4LEF | DOUBLE-SIDED, 1-IN-1 | N/A |
| J0005 | FULL-COLOR | B4SEF | SINGLE-SIDED, 1-IN-1 | PUNCH HOLE |
| J0006 | MONOCHROME | A4LEF | SINGLE-SIDED, 1-IN-1 | STAPLING |
| J0008 | MONOCHROME | B4SEF | SINGLE-SIDED, 2-IN-1 | N/A |
| J0001_2 | FULL-COLOR | A3SEF | SINGLE-SIDED, 1-IN-1 | PUNCH HOLE |
| ... | ... | ... | ... | ... |

| JOB_ID | COLOR MODE | RESOLUTION | FORMAT | DELIVERY DESTINATION | |
|---|---|---|---|---|---|
| J0002 | FULL-COLOR | 200DPI | JPEG | MORI | RC |
| J0004 | MONOCHROME | 600DPI | PDF | TANI | RC |
| J0007 | MONOCHROME | 200DPI | JPEG | HAYASHI | RC |
| J0009 | FULL-COLOR | 400DPI | JPEG | TANI | RC |
| J0002_2 | FULL-COLOR | 400DPI | JPEG | MORI | RC |
| ... | ... | ... | ... | ... | |

METHOD, SYSTEM, AND APPARATUS FOR OUTPUTTING IMAGE, AND COMPUTER-READABLE STORAGE MEDIUM FOR COMPUTER PROGRAM

This application is based on Japanese patent application No. 2009-218033 filed on Sep. 18, 2009, the contents of which are hereby incorporated by reference.

BACKGROUND OF THE INVENTION

1. Field of the Invention

The present invention relates to a method, a system, an apparatus, and the like for outputting an image by sending image data or printing.

2. Description of the Related Art

Image forming apparatuses having a variety of functions, such as copying, PC printing, scanning, faxing, and file server, have recently come into widespread use. Such image forming apparatuses are sometimes called "multifunction devices", "Multi-Function Peripherals (MFPs)", or the like.

In recent years, electronic paper has been attracting attention. Examples of a method for displaying an image on electronic paper are a microcapsule method, a liquid crystal method, and an electrophoretic method. Electronic paper based on each of the methods has the following features.

The electronic paper is configured to keep displaying images thereon without drawing electricity. As compared with a Cathode Ray Tube (CRT) display, a Liquid Crystal Display (LCD), and the like, the electronic paper has very low power consumption. Further, the electronic paper is configured to display an image by using reflected light as with ordinary paper, which results in the less adverse effect on human eyes than in the CRT display and the LCD. The electronic paper also has characteristics of being thin and flexible like ordinary paper.

There are proposed methods for displaying an image on electronic paper before outputting the image from an image forming apparatus in order for a user to confirm in what way the image will be outputted (see Japanese Laid-open Patent Publication Nos. 2005-238709, 2007-144674, 2006-041801, 2007-079809, and 2005-175942). As just described, outputting an image on a display or the like, for confirmation, prior to desired output of the image such as printing is generally called a "print preview".

If a user uses a print preview feature in electronic paper, for example, he/she can temporarily remove the electronic paper from an image forming apparatus and bring back the electronic paper to his/her seat. Then, he/she can take time to consider whether an image is to be printed as is, or the image is to be corrected before printing. If the user belongs to an organization, he/she can consider whether or not to make corrections to the image with other members.

As a result, when the user determines that the image is to be printed as is, he/she goes to the site of the image forming apparatus again. The user, then, connects the electronic paper to the image forming apparatus and causes the image forming apparatus to start a process for outputting the image desirably.

In the case where an image forming apparatus is installed in facilities of organizations such as offices of business, public organizations, and educational institutions, the image forming apparatus is often shared by a plurality of users. The same is similarly applied to the case where an image forming apparatus is installed in facilities in which many and unspecified persons gather, such as libraries, convenience stores, and supermarkets.

Thus, even if a user creates a preview of an image for confirmation on electronic paper and goes to the site of an image forming apparatus again, another person probably uses the image forming apparatus. In such a case, the user has to wait for the person to finish using the image forming apparatus. Under such circumstances, it would be convenient for the user to use another available image forming apparatus and to cause the available image forming apparatus to start a process for outputting the image desirably.

SUMMARY

The present disclosure is directed to solve the problems pointed out above, and therefore, an object of an embodiment of the present invention is to, as compared with conventional technologies, facilitate output of an image with another available image forming apparatus and the like after displaying a preview of the image to be outputted on electronic paper for confirmation.

According to an aspect of the present invention, a system for outputting an image includes a first image output apparatus, and a second image output apparatus. The first image output apparatus includes a display processing portion that displays an image to be outputted on electronic paper based on a first condition under which a job to output the image is executed, a conditions storing processing portion that stores, in a conditions storage portion, the first condition in association with a job identifier for identifying the job, and a job identifier storing processing portion that stores the job identifier in the electronic paper. The second image output apparatus includes a reading portion that reads out the job identifier from the electronic paper, an obtaining portion that obtains, from the conditions storage portion, the first condition corresponding to the job identifier thus read out, and a job execution portion that executes a whole or a part of the job based on the first condition thus obtained.

Preferably, the conditions storage portion is implemented by a storage provided in the first image output apparatus, the conditions storing processing portion stores, in the conditions storage portion, the first condition in association with a device identifier for identifying the first image output apparatus, the job identifier storing processing portion stores the job identifier together with the device identifier in the electronic paper, the reading portion reads out the job identifier together with the device identifier, and the obtaining portion obtains the first condition by connecting to the first image output apparatus based on the device identifier thus read out, requesting the first image output apparatus for a condition corresponding to the job identifier read out together with the device identifier, and receiving the condition from the first image output apparatus.

Alternatively, the conditions storage portion is implemented by a server having a function to communicate with the first image output apparatus and the second image output apparatus, or a nonvolatile memory included in the electronic paper.

These and other characteristics and objects of the present invention will become more apparent by the following descriptions of preferred embodiments with reference to drawings.

BRIEF DESCRIPTION OF THE DRAWINGS

FIG. 6 is a diagram illustrating an example of a job summary table.

FIG. 7 is a diagram illustrating an example of a print job details table.

FIG. 8 is a diagram illustrating an example of a delivery job details table.

FIG. 14 is a diagram illustrating an example of a conditions specifying screen.

FIG. 26 is a diagram illustrating a modification of a job summary table.

FIG. 27 is a diagram illustrating a modification of a print job details table.

FIG. 28 is a diagram illustrating a modification of a delivery job details table.

DESCRIPTION OF THE PREFERRED EMBODIMENTS

Figure 1:
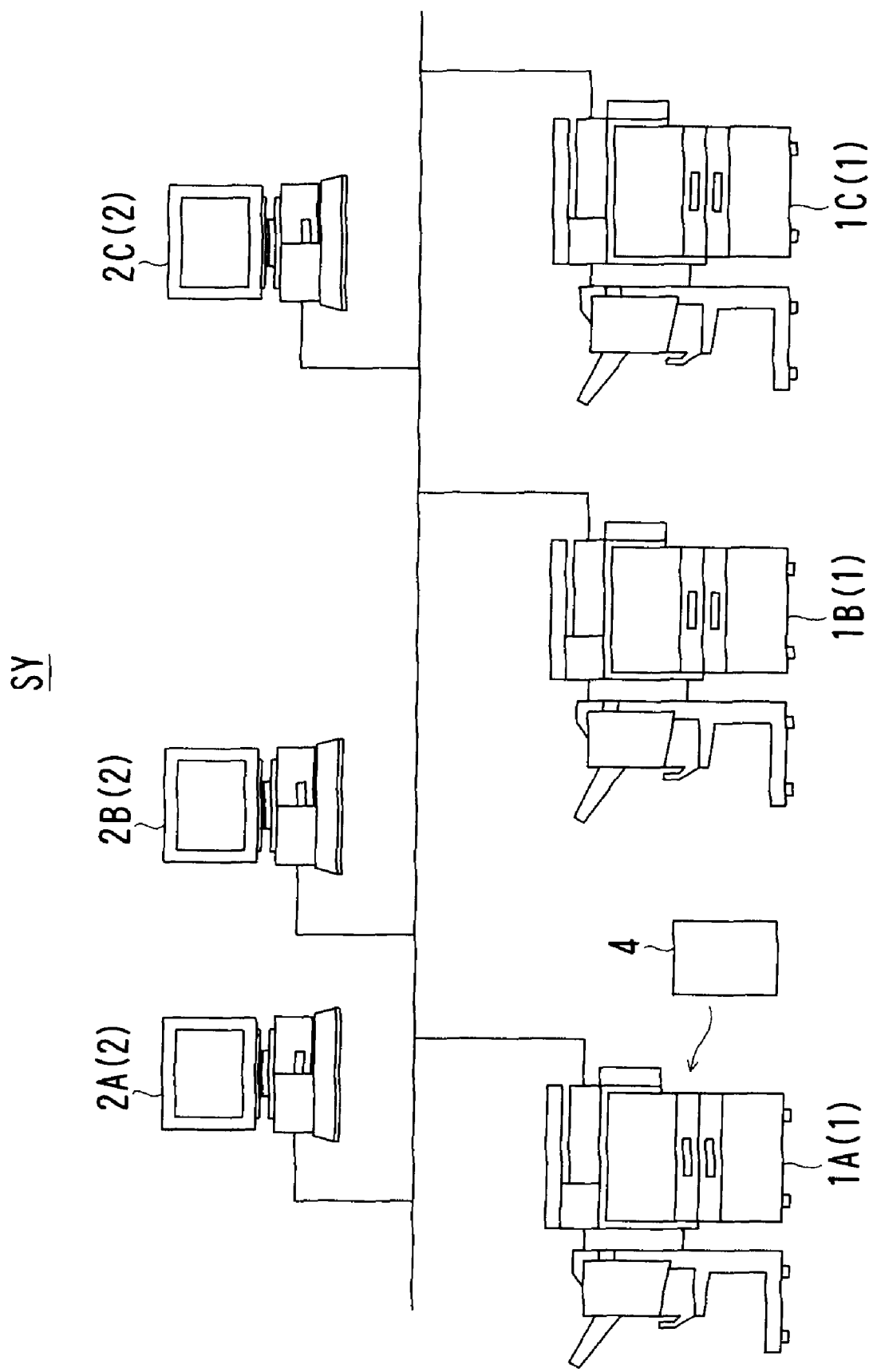
FIG. 1 is a diagram illustrating an example of the overall configuration of a network system.
Figure 2:
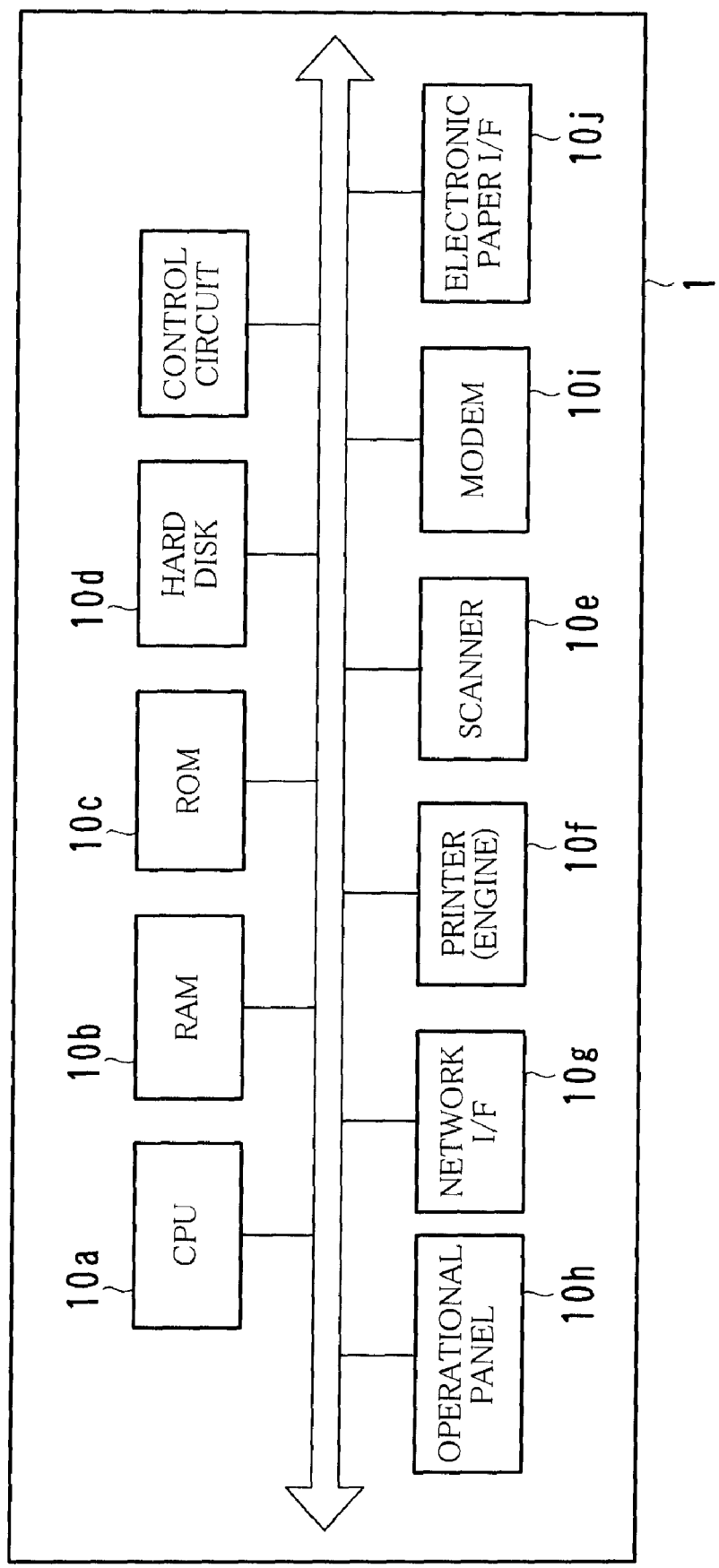
FIG. 2 is a diagram illustrating an example of the hardware configuration of an image forming apparatus.
Figure 3:
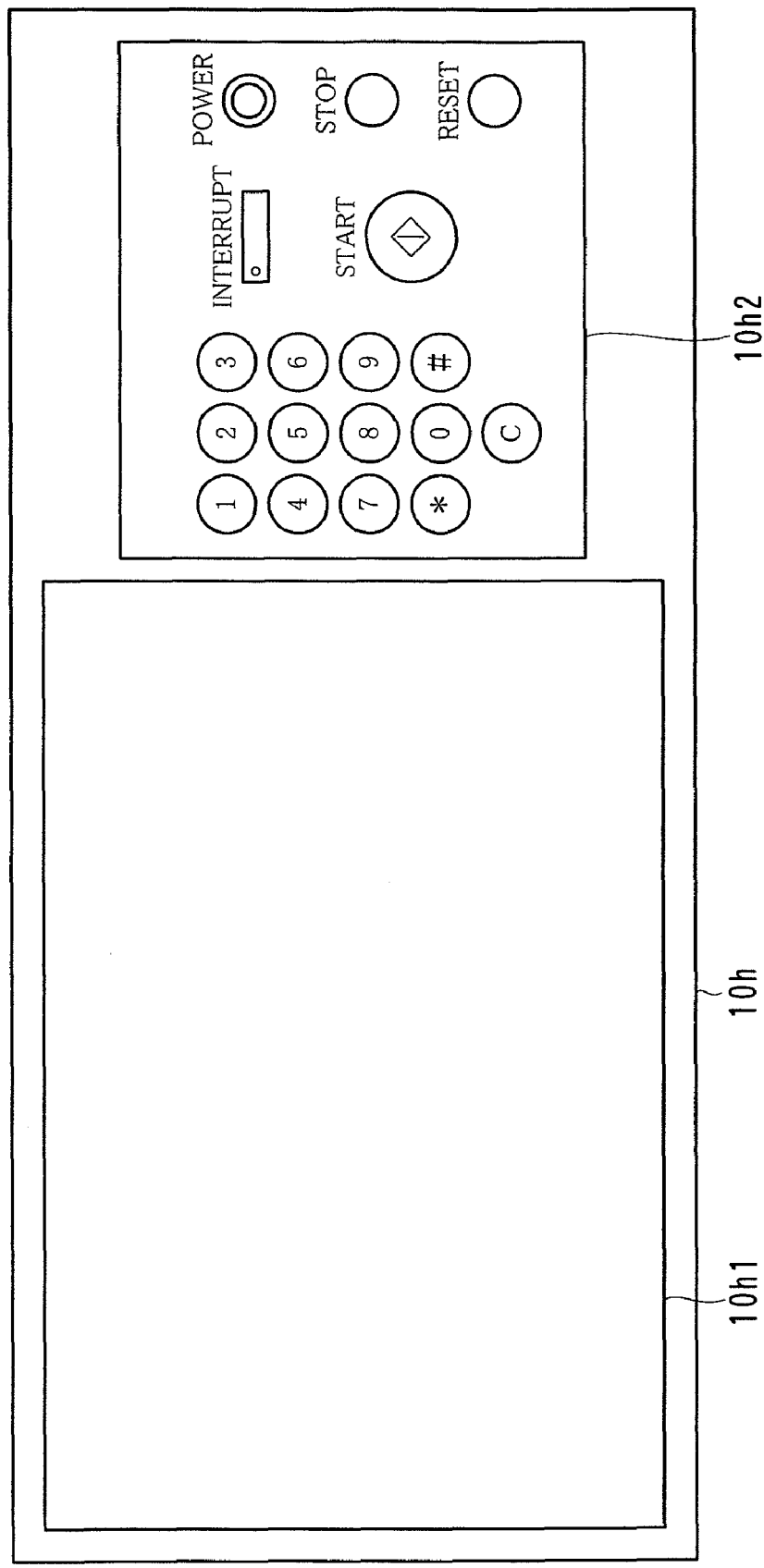
FIG. 3 is a diagram illustrating an example of the structure of an operational panel.
Figure 4:
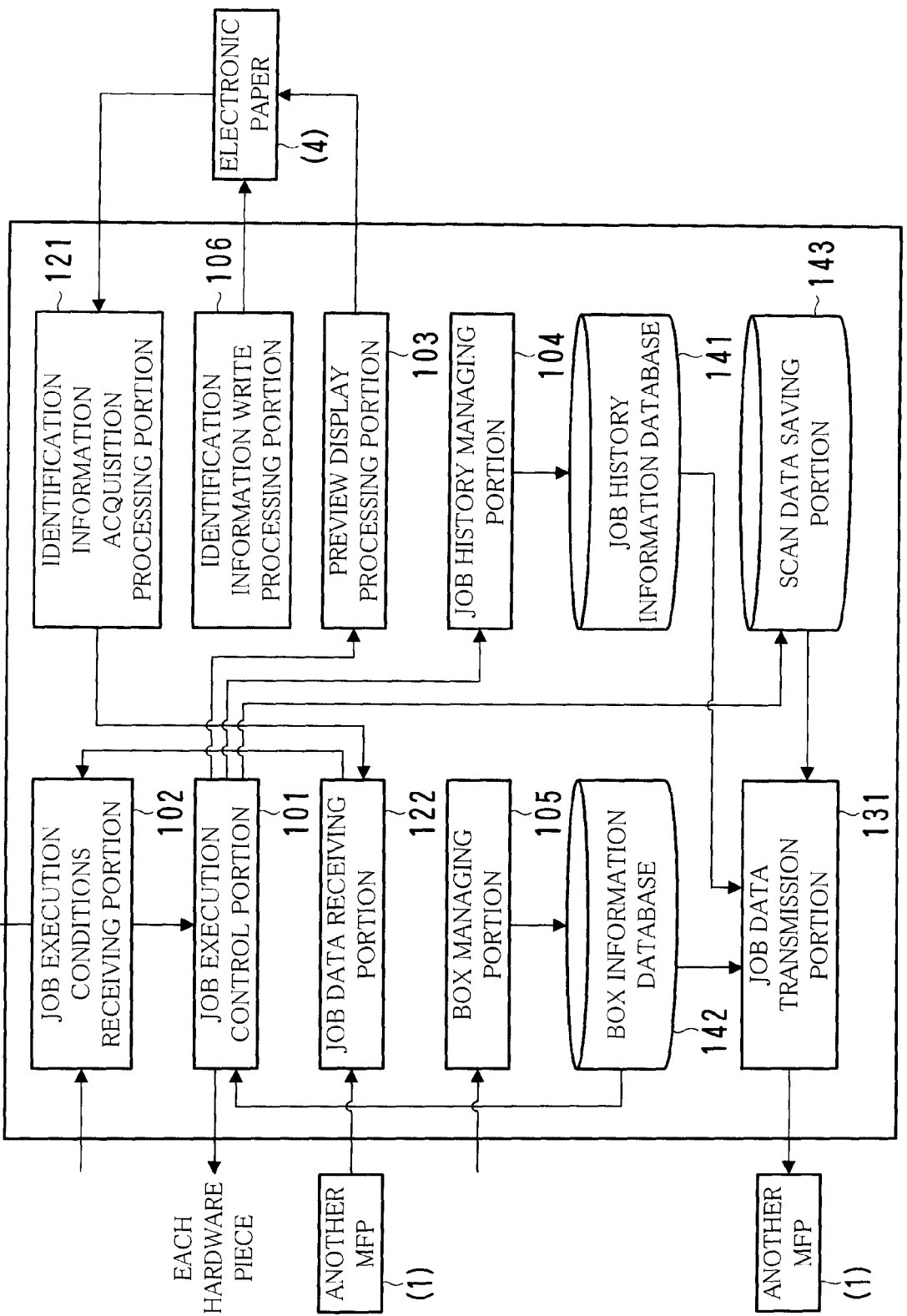
FIG. 4 is a diagram illustrating an example of the functional configuration of an image forming apparatus.
Figure 5:
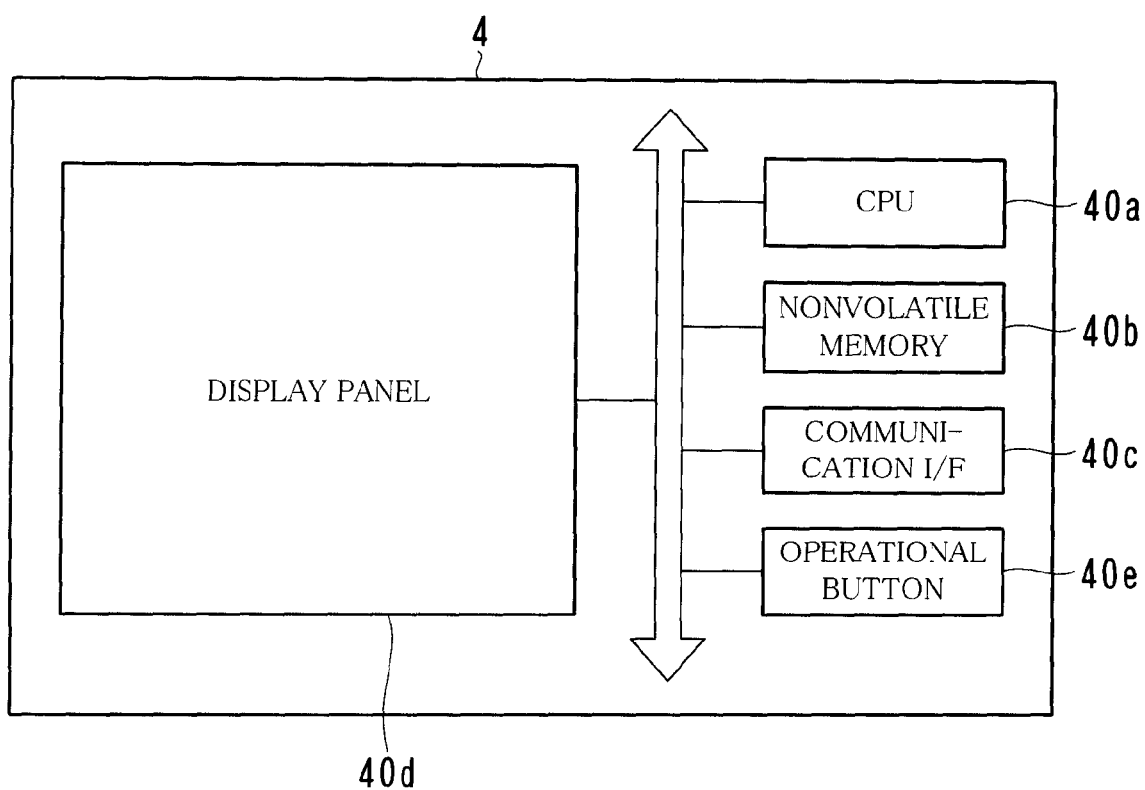
FIG. 5 is a diagram illustrating an example of the hardware configuration of electronic paper.

FIG. 1 is a diagram illustrating an example of the overall configuration of a network system SY; FIG. 2 is a diagram illustrating an example of the hardware configuration of an image forming apparatus 1; FIG. 3 is a diagram illustrating an example of the structure of an operational panel 10h; FIG. 4 is a diagram illustrating an example of the functional configuration of the image forming apparatus 1; and FIG. 5 is a diagram illustrating an example of the hardware configuration of electronic paper 4.

Referring to FIG. 1, the network system SY is configured of a plurality of the image forming apparatuses 1, a plurality of terminals 2, a communication line 3, and so on. These apparatuses and terminals are connectable to one another via the communication line 3. Examples of the communication line 3 are a public line, a dedicated line, the Internet, and a so-called Local Area Network (LAN).

The network system SY is installed in organizations such as business offices or public offices, and is used by members belonging to such an organization. The following is a description of an example in which the network system SY is used in an X-company. An employee of the X-company is hereinafter referred to as a "user".

The image forming apparatus 1 is an image processing apparatus generally called a multifunction device or a Multi Function Peripheral (MFP). The image forming apparatus 1 is a device that integrates a variety of functions, such as copying, PC printing (network printing), faxing, scanning, box function, electronic mail communication function, and so on, into a single unit.

The "PC printing" function is a function to print an image onto paper based on image data received from the terminal 2.

The box function is a function in which storage areas called "boxes" or "personal boxes" are allocated on a user-by-user basis, and data such as image data and the like is saved to a user's own storage area and managed therein. The boxes herein correspond to "folders" or "directories" in a personal computer. In this embodiment, data is saved in a box on a file-by-file basis.

One image forming apparatus 1 is installed on each floor of a building of the X-company. Hereinafter, the image forming apparatuses 1 are sometimes distinguished from one another as an "image forming apparatus 1A", an "image forming apparatus 1B", an "image forming apparatus 1C", and so on. The image forming apparatuses 1 have the same structure. Each of the image forming apparatuses 1 is given a unique identifier, i.e., an MFP ID.

A user operates any image forming apparatus 1 directly or remotely; thereby to use the functions discussed above. In particular, according to this embodiment, the user can cause electronic paper to display in what way an image is to be outputted before operating any image forming apparatus 1 to perform a process of outputting the image under certain conditions. Such displaying is generally called a "preview". Hereinafter, a window displayed, as a preview, on a display such as the electronic paper 4 is referred to as a "preview screen".

The user can also use the electronic paper 4 to easily output the image by using another image forming apparatus 1 under the same conditions as those applied to the image forming apparatus 1 specified first by the user. A method for performing such operation is described in order below.

Referring to FIG. 2, the image forming apparatus 1 is configured of a Central Processing Unit (CPU) 10a, a Random Access Memory (RAM) 10b, a Read Only Memory (ROM) 10c, a hard disk 10d, a scanner 10e, a printer 10f, a network interface 10g, an operational panel 10h, a modem 10i, an electronic paper interface 10j, a control circuit, and so on.

The scanner 10e is a device that reads images printed on paper, such as photographs, characters, drawings, diagrams, and the like, and creates image data thereof.

The printer 10f serves to print, onto paper, an image obtained by scanning with the scanner 10e or an image included in image data received from another device.

The operational panel 10h is configured of a touchscreen 10h1, a key group 10h2, and the like as shown in FIG. 3.

The touchscreen 10h1 displays, for example, a screen for giving a message to a user, a screen for displaying the result of a process, and a screen for the user to enter a command to be given to the image forming apparatus 1. The touchscreen 10h1 also detects a position thereof touched (pressed) by the user and informs the CPU 10a of the touched position.

The key group 10h2 is configured of a numeric keypad and keys such as a start key and a stop key.

The user operates the operational panel 10h; thereby to give a command to the image forming apparatus 1 or to enter data thereinto.

The network interface 10g is a Network Interface Card (NIC) for communicating with the terminal 2 or another image forming apparatus 1 according to Transmission Control Protocol/Internet Protocol (TCP/IP) via the communication line 3.

The modem 10i is a device to perform communication with another facsimile terminal via a fixed-line telephone network based on a protocol such as Group 3 (G3).

The electronic paper interface 10j is a device to perform communication with electronic paper. This embodiment describes an example of employing electronic paper using Bluetooth. Accordingly, the electronic paper interface 10j is a device performing wireless communication based on the Bluetooth. Alternatively, the image forming apparatus 1 may be connected to the electronic paper 4 by using an interface according to other existing standards such as a Universal Serial Bus (USB) or a wireless LAN, or an interface exclusively for electronic paper.

Referring to FIG. 4, the ROM 10c or the hard disk 10d stores programs for implementing functions of a job execution control portion 101, a job execution conditions receiving portion 102, a preview display processing portion 103, a job history managing portion 104, a box managing portion 105, an identification information write processing portion 106, an identification information acquisition processing portion 121, a job data receiving portion 122, a job data transmission portion 131, a job history information database 141, a box information database 142, a scan data saving portion 143, and the like. These programs are loaded into the RAM 10b as necessary, whereupon the programs are executed by the CPU 10a.

The whole or a part of the functions of the individual portions illustrated in FIG. 4, and the like may be implemented merely by hardware such as a circuit.

Referring back to FIG. 1, a driver for causing the image forming apparatus 1 to perform a process for printing an image is installed on the terminal 2. A personal computer, a Personal Digital Assistant (PDA), or the like is used as the terminal 2. Hereinafter, the terminals 2 are sometimes distinguished from one another as a "terminal 2A", a "terminal 2B", a "terminal 2C", and so on.

The electronic paper 4 is electronic paper used to, for example, display a preview screen thereon. Referring to FIG. 5, the electronic paper 4 is configured of a CPU 40a, a nonvolatile memory 40b, a communication interface 40c, a display panel 40d, an operational button 40e, and the like.

The CPU 40a serves to control the entire electronic paper 4. The operational button 40e is used for a user to give a command to the electronic paper 4.

The nonvolatile memory 40b records, therein, image data, and a pair of an MFP ID and a job ID.

The communication interface 40c is an interface to perform communication with the image forming apparatus 1. In this embodiment, Bluetooth is used as the communication interface 40c; thereby enabling the electronic paper 4 to perform communication wirelessly with the image forming apparatus 1.

The display panel 40d displays a preview screen thereon. The display panel 40d may be a microcapsule-type display panel, a liquid crystal-type display panel, an electrophoresis-type display panel, or the like.

Next, a description is given of the details of processes performed by the individual portions of the image forming apparatus 1 shown in FIG. 4, a method for operating the image forming apparatus 1, a method for using the electronic paper 4, and the like.

[Basic Process and Operation]

Figure 9:
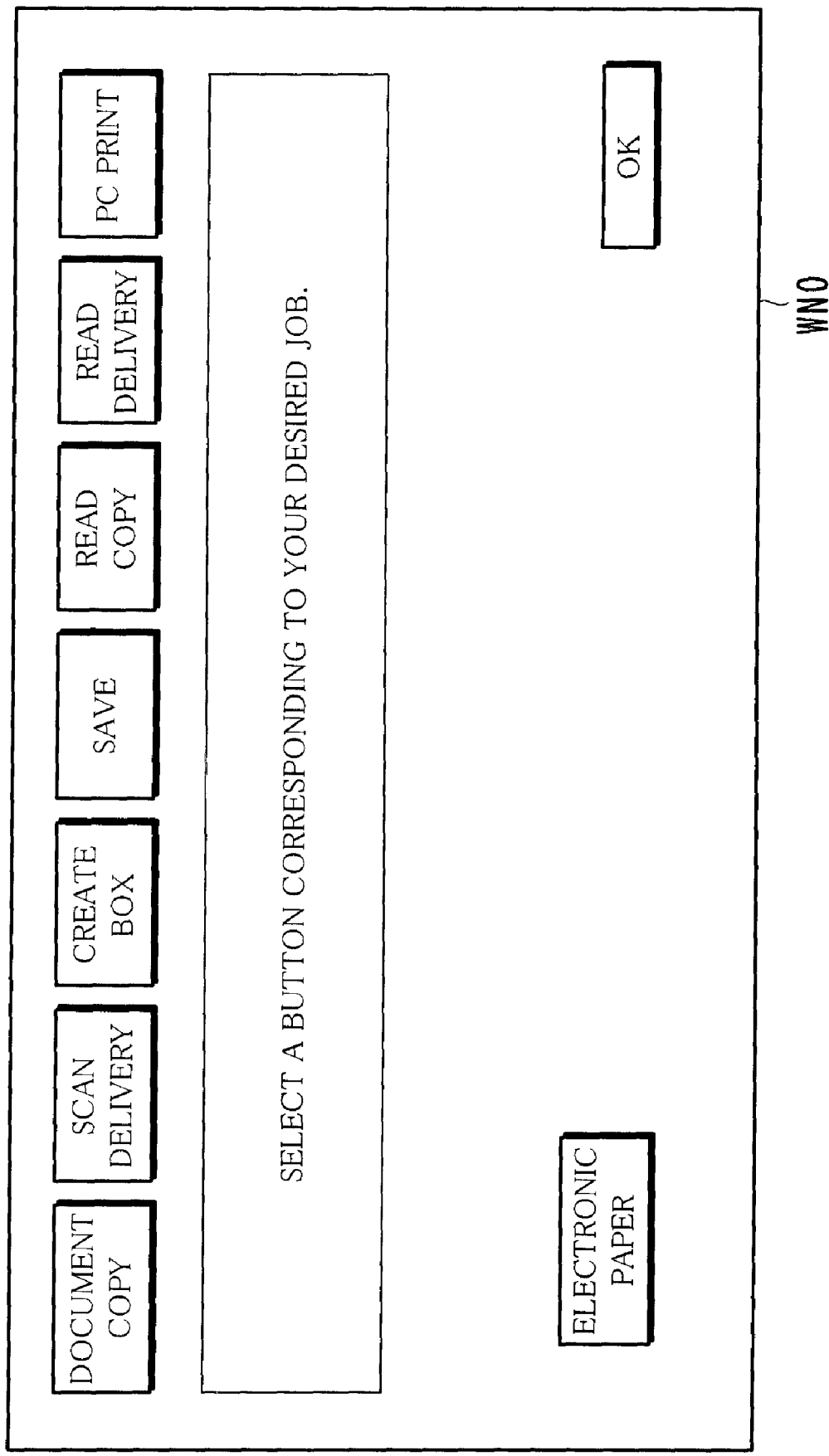
FIG. 9 is a diagram illustrating an example of a top screen.

FIG. 6 is a diagram illustrating an example of a job summary table TB1; FIG. 7 is a diagram illustrating an example of a print job details table TB2; FIG. 8 is a diagram illustrating an example of a delivery job details table TB3; and FIG. 9 is a diagram illustrating an example of a top screen WN0.

The job execution control portion 101 of the image forming apparatus 1 shown in FIG. 4 controls the individual pieces of hardware of the image forming apparatus 1 in such a manner that a job is executed in accordance with a command given by a user.

To be specific, the job execution control portion 101 performs control such that a job is executed in accordance with conditions. The conditions are obtained through the following two methods. The first method is to obtain conditions by prompting a user to enter the conditions on an entry screen displayed on the touchscreen 10h1 of the subject image forming apparatus 1. The second method is to obtain conditions from another image forming apparatus 1 based on information read out from the electronic paper 4. The two methods are detailed in order below.

In the meantime, the image forming apparatus 1 is configured to execute the following five types of jobs as jobs to output an image.

First, a "document copy job" is a job to scan a document image depicted on paper to print (copy) the image onto a separate sheet of paper. Second, a "scan delivery job" is a job to generate image data by scanning a document image depicted on paper, and to deliver (send) the image data generated to the terminal 2.

Third, a "read copy job" is a job to read out image data saved in a box, and to print an image onto paper based on the image data thus read out. Fourth, a "PC print job" is a job to print an image onto paper based on image data received from the terminal 2. Lastly, the fifth job is a "read delivery job" that is to read out image data saved in a box and deliver the image data to the terminal 2.

The image forming apparatus 1 installs, thereon, applications used for executing these types of jobs. The CPU 10a executes these applications; thereby to implement the job execution control portion 101. Accordingly, each of the names of the job types is sometimes hereinafter referred to as an "application name".

Referring back to FIG. 4, the preview display processing portion 103 performs a process for displaying a preview screen of an image to be outputted as a result of a job to be executed by the job execution control portion 101.

Every time the job execution control portion 101 executes a job, the job history managing portion 104 issues a job ID that is a unique identifier to the job. The job history managing portion 104, then, generates a summary record RA and stores the summary record RA in the job summary table TB1. The summary record RA includes the MFP ID of the subject image forming apparatus 1, the job ID issued by the job history managing portion 104, a type of the job, i.e., an application name, and a date and time at which the job was executed, i.e., an execution date and time. If the job is either a read copy job or a read delivery job, the summary record RA further includes the name of a file of image data that has been used for the job, and the name of a box saving the file, i.e., a box name.

In this way, every time a job is executed, a summary record RA indicating the history of the job is generated. As shown in FIG. 6, summary records RA are accumulated in the job summary table TB1.

Every time a job is executed, the job history managing portion 104 generates a details record depending on the type of the job in the following manner.

If a job is any one of a document copy job, a scan delivery job, and a PC print job, or, in other words, if a job involves printing, then the job history managing portion 104 generates a job details record RB indicating conditions to execute a job as illustrated in FIG. 7, and stores the generated job details record RB in the print job details table TB2.

Referring to a job details record RB for a certain job, the field of "job ID" indicates a job ID issued to the job. The "color mode" field indicates whether printing performed based on the job is full-color printing or monochrome printing. The "paper size" field indicates the size and direction of paper that has been used for printing. The "single-sided/double-sided, N-in-1" field indicates whether the print side is one face or both faces of paper, and the number of pages whose images have been printed on one face of paper. The "paper output mode" field indicates a method for applying a finish to a printed matter.

On the other hand, if a job is either a scan delivery job or a read delivery job, or, in other words, if a job involves delivering image data, then the job history managing portion 104 generates a job details record RC indicating conditions to execute a job as illustrated in FIG. 8, and stores the generated job details record RC in the delivery job details table TB3.

Referring to a job details record RC for a certain job, the field of "job ID" indicates a job ID issued to the job. The "color mode" field indicates whether image data delivered based on the job is data to reproduce a color image or data to reproduce a monochrome image. The "resolution" field indicates a resolution of an image reproducible based on the image data. The "format" field indicates a format of the image data. The "delivery destination" field indicates the name of a user corresponding to a delivery destination of the image data, i.e., a user name. Instead of the user name, an electronic mail address, an IP address of the terminal 2, or the like may be indicated in the "delivery destination" field.

The job history information database 141 stores, therein, the job summary table TB1, the print job details table TB2, and the delivery job details table TB3.

Referring back to FIG. 4, the scan data saving portion 143 saves, therein, image data of an image that is a job target and is obtained by the scanner 10e or sent from the terminal 2.

The box information database 142 contains boxes for individual users. Each of the users can save image data in his/her box by his/her own volition.

The box managing portion 105 performs a process for managing boxes. To be specific, the box managing portion 105 creates a new box for a user in the box information database 142, or save image data in a box. These processes are performed in accordance with operation by a user in the following manner.

When the user performs predetermined operation, e.g., presses a reset key (see FIG. 3) of the key group 10h2, the top screen WN0 as shown in FIG. 9 is displayed on the touch-screen 10h1.

If the user presses a "create box" button on the top screen WN0, then the box managing portion 105 displays a screen on which a box name is to be entered. The user enters a unique box name on the displayed screen in such a manner to avoid duplication of existing box names. Responding to this operation, the box managing portion 105 generates a new box having the entered box name in the box information database 142.

Alternatively, if the user presses a "save" button on the top screen WN0, then the box managing portion 105 displays a screen for specifying the current path of image data to be saved, i.e., a storage location and a file name, and a box corresponding to the storage location. The user specifies them on the displayed screen. Responding to this operation, the box managing portion 105 obtains image data based on the current path specified, and saves, as a file, the image data in the box specified as the storage location.

[Case of Executing a New Job]

In the case where a user causes the image forming apparatus 1 to execute a new job, the user specifies a type of the new job and conditions for the new job in the image forming apparatus 1. The job execution conditions receiving portion 102 performs a process for receiving the details specified by the user.

The preview display processing portion 103 displays a preview of an image for a case where the image is to be outputted under the received conditions. The job execution control portion 101 executes a job in accordance with the received conditions.

A description is given below, for each type of job, of operation by a user for specifying a new job type and new job conditions, and processes performed by the individual portions of the image forming apparatus 1 for a case where the electronic paper 4 displays a preview screen.

Case A: Case Where a New Job is a Document Copy Job

Figure 10:
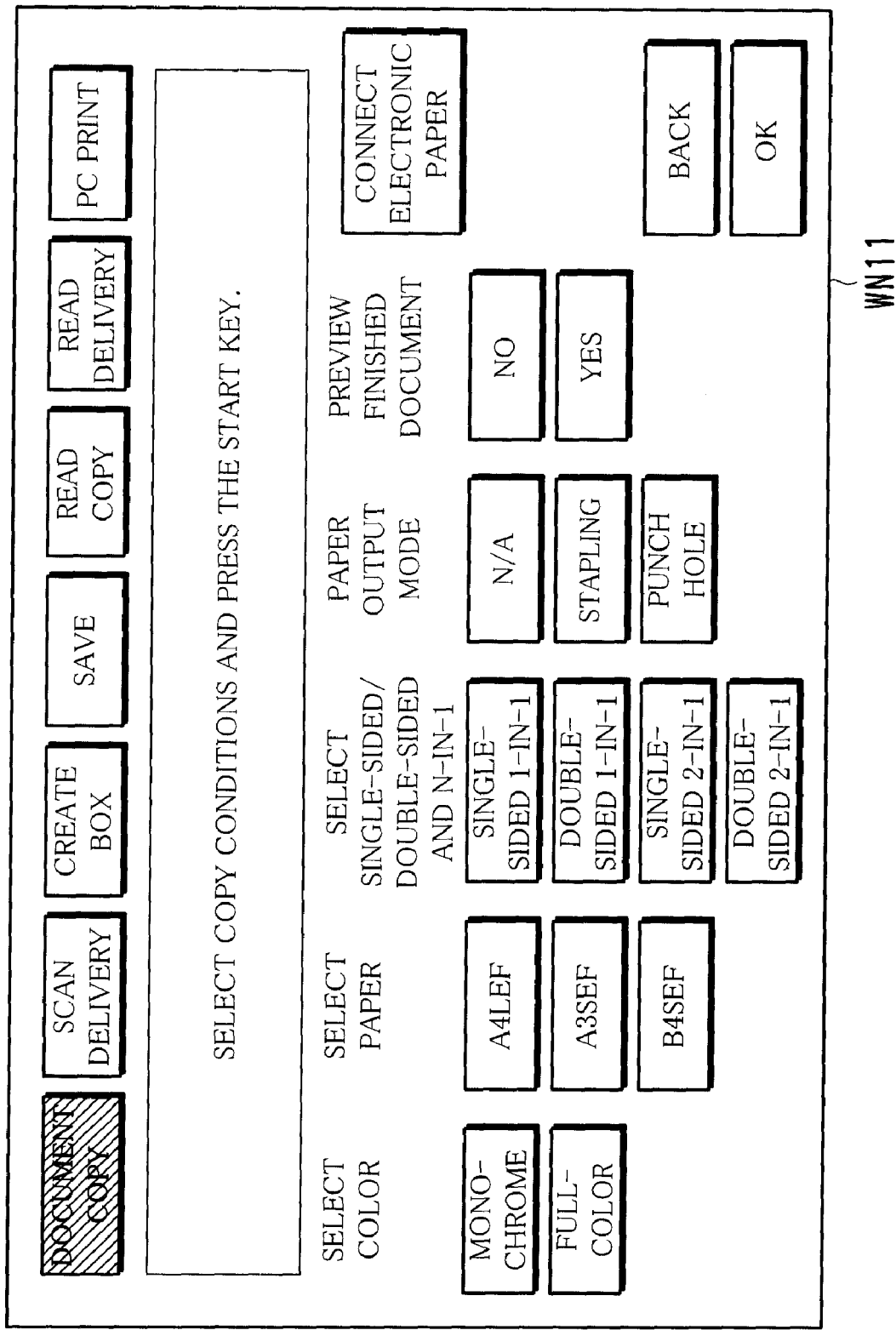
FIG. 10 is a diagram illustrating an example of a conditions specifying screen.
Figure 11:
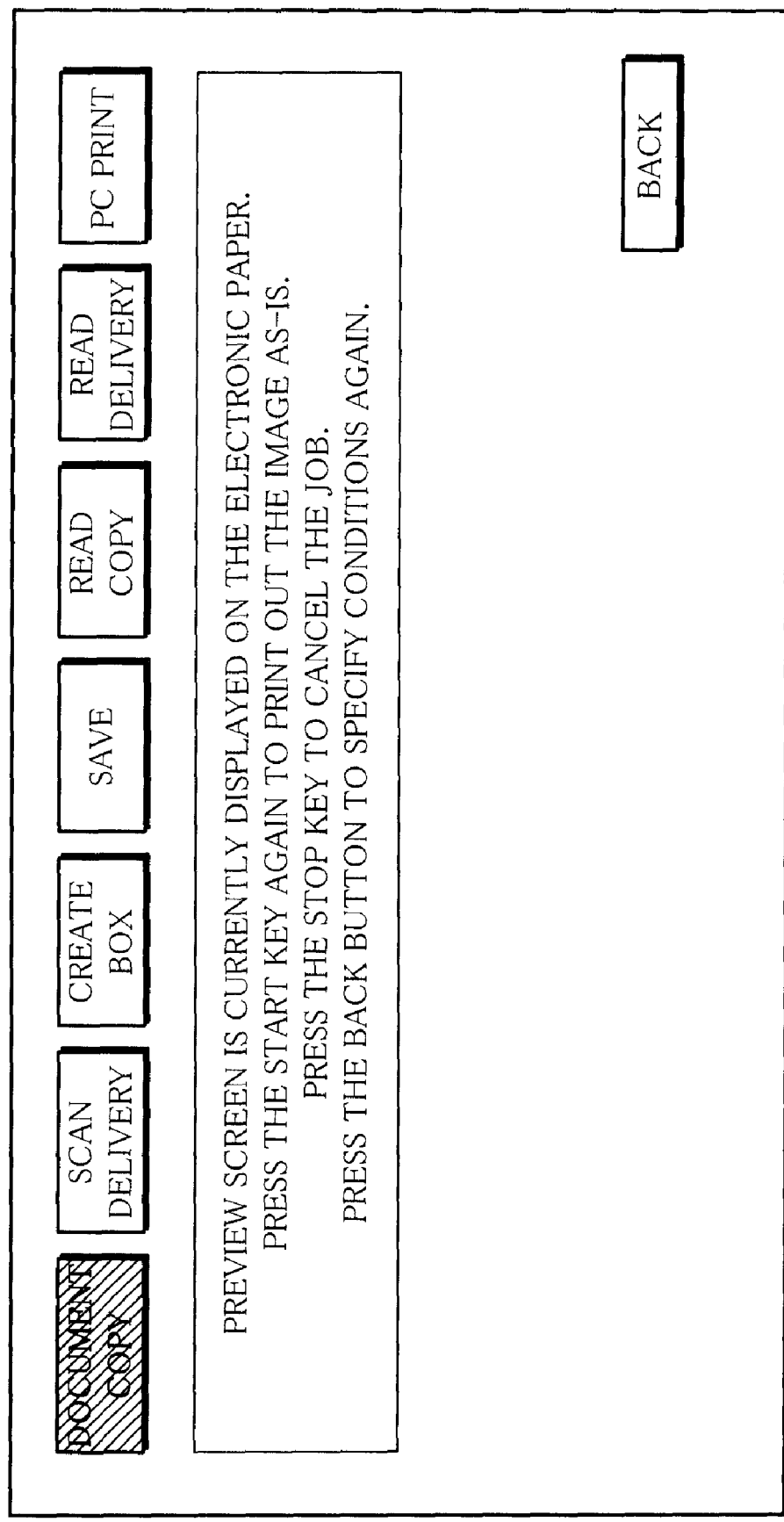
FIG. 11 is a diagram illustrating an example of a preview notifying screen.

FIG. 10 is a diagram illustrating an example of a conditions specifying screen WN11, and FIG. 11 is a diagram illustrating an example of a preview notifying screen WN12.

A user places paper on which a document image is depicted on a document tray, and presses a "document copy" button on the top screen WN0 shown in FIG. 9.

Responding to this, the job execution conditions receiving portion 102 displays the conditions specifying screen WN11 as shown in FIG. 10. The user specifies desired conditions by pressing corresponding buttons on the conditions specifying screen WN11.

In the case where the user intends to confirm an image on a preview screen of the electronic paper 4 before a process for printing the image onto paper is started, he/she connects the electronic paper 4 to the electronic paper interface 10j, and presses a "YES" button of a "preview finished document" column. When the electronic paper 4 is properly connected to the electronic paper interface 10j, the image forming apparatus 1 transits to a state where a "connect electronic paper" button is pressed. In this way, preparation of a preview screen is conducted. The steps for preparing the preview screen are similarly applied to the cases of the other types of jobs described later.

After specifying the conditions and preparing the preview screen if necessary, the user presses the start key (see FIG. 3) of the key group 10h2.

Responding to this operation, the job execution conditions receiving portion 102 receives, as a job type, the "document copy job", and, as conditions, the details specified on the conditions specifying screen WN11.

If the "YES" button is pressed on the conditions specifying screen WN11, then the preview display processing portion 103 causes the scanner 10e to scan an image depicted on paper placed thereon, i.e., to so-called pre-scan. Thereby, image data of an image to be copied is obtained.

The preview display processing portion 103 constructs an image that is supposed to be obtained if the document is printed under the received conditions based on the image data. The preview display processing portion 103, then, displays the constructed image on the electronic paper 4 connected to the image forming apparatus 1. In the case where, for example, conditions including "2-in-1" are received, the preview display processing portion 103 displays an image in which document images depicted on two faces of the paper are arranged per paper (per display surface if indication entirely displayed on the display panel 40d is regarded as one surface).

At this time, the preview display processing portion 103 displays the preview notifying screen WN12 as shown in FIG. 11 on the touchscreen 10h1 (see FIG. 3).

While viewing the image displayed on the electronic paper 4, the user determines whether or not to start a process for printing the image onto paper. If the user considers that it is impossible to obtain a desired printed matter, then he/she presses a "BACK" button. Thereby, the job is cancelled. Then, the job execution conditions receiving portion 102 displays, once again, the conditions specifying screen WN11 as shown in FIG. 10. The user, then, preferably places the paper once again on the document tray and specifies conditions once again. On the other hand, if the user considers that a desired printed matter is probably obtained, then the user presses the start key of the key group 10h2 to start the job. The same operation is similarly applied to the cases of the other types of jobs described later. To be specific, the "BACK" button is pressed to specify conditions once again, and the start key is pressed to execute a job under the specified conditions.

When the start key is pressed, the job execution control portion 101 controls the printer 10f or the like to print (copy) the image onto paper under the conditions received by the job execution conditions receiving portion 102 based on the image data obtained by scanning with the scanner 10e. Image data may be newly obtained and the new image data may be used, or image data obtained by pre-scanning may be used.

As described above, the job history managing portion 104 generates a summary record RA and a job details record RB for the job, and stores the summary record RA and the job details record RB respectively in the job summary table TB1 (see FIG. 6) and the print job details table TB2 (see FIG. 7).

The identification information write processing portion 106 associates the MFP ID of the subject image forming apparatus 1 with the job ID of the job, and writes the resultant into the nonvolatile memory 40b of the electronic paper 4 via the electronic paper interface 10j.

The image data obtained by the scanner 10e is associated with the job ID, and stored in the scan data saving portion 143.

Case B: Case Where a New Job is a Scan Delivery Job

Figure 12:
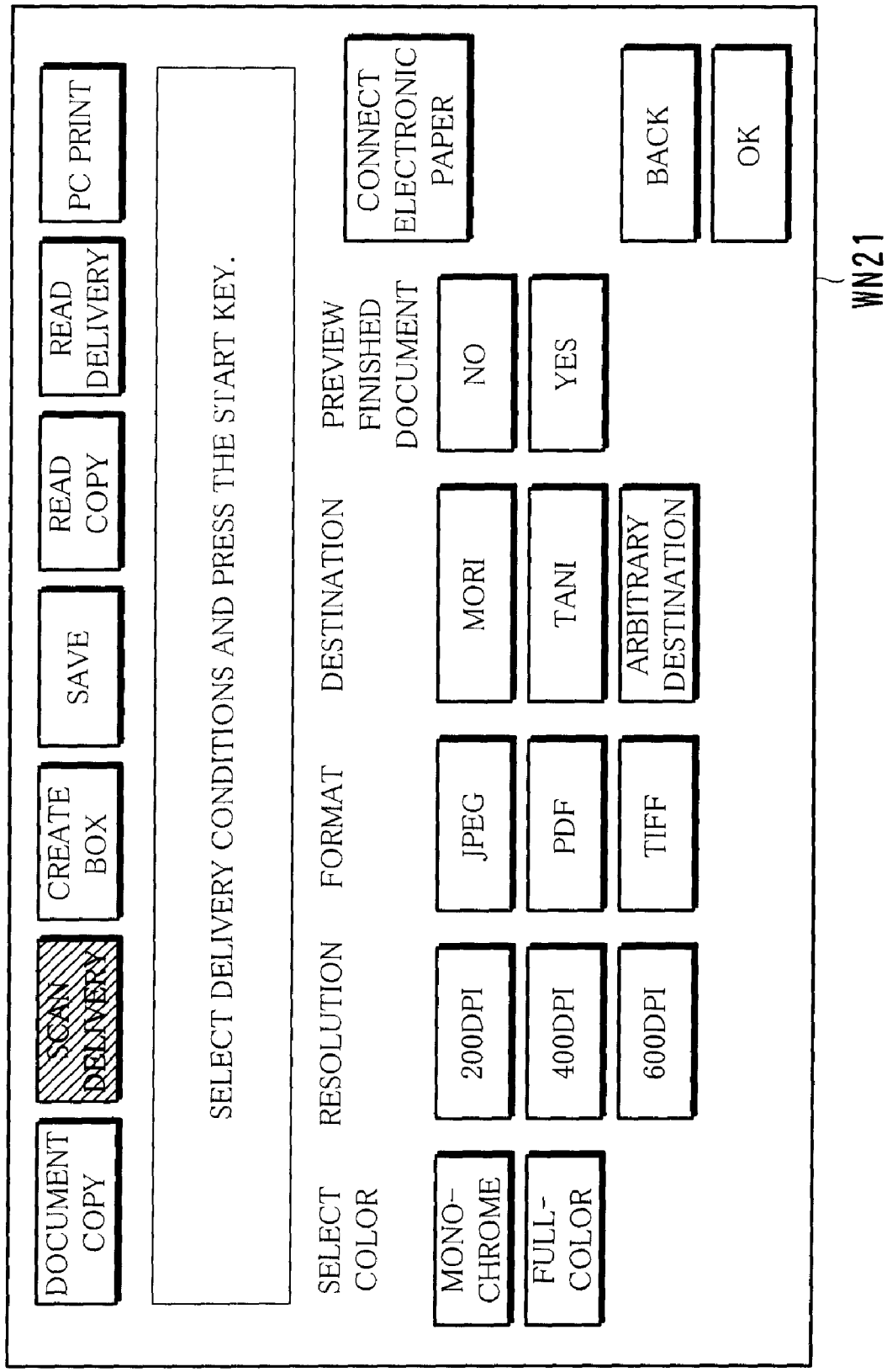
FIG. 12 is a diagram illustrating an example of a conditions specifying screen.
Figure 13:
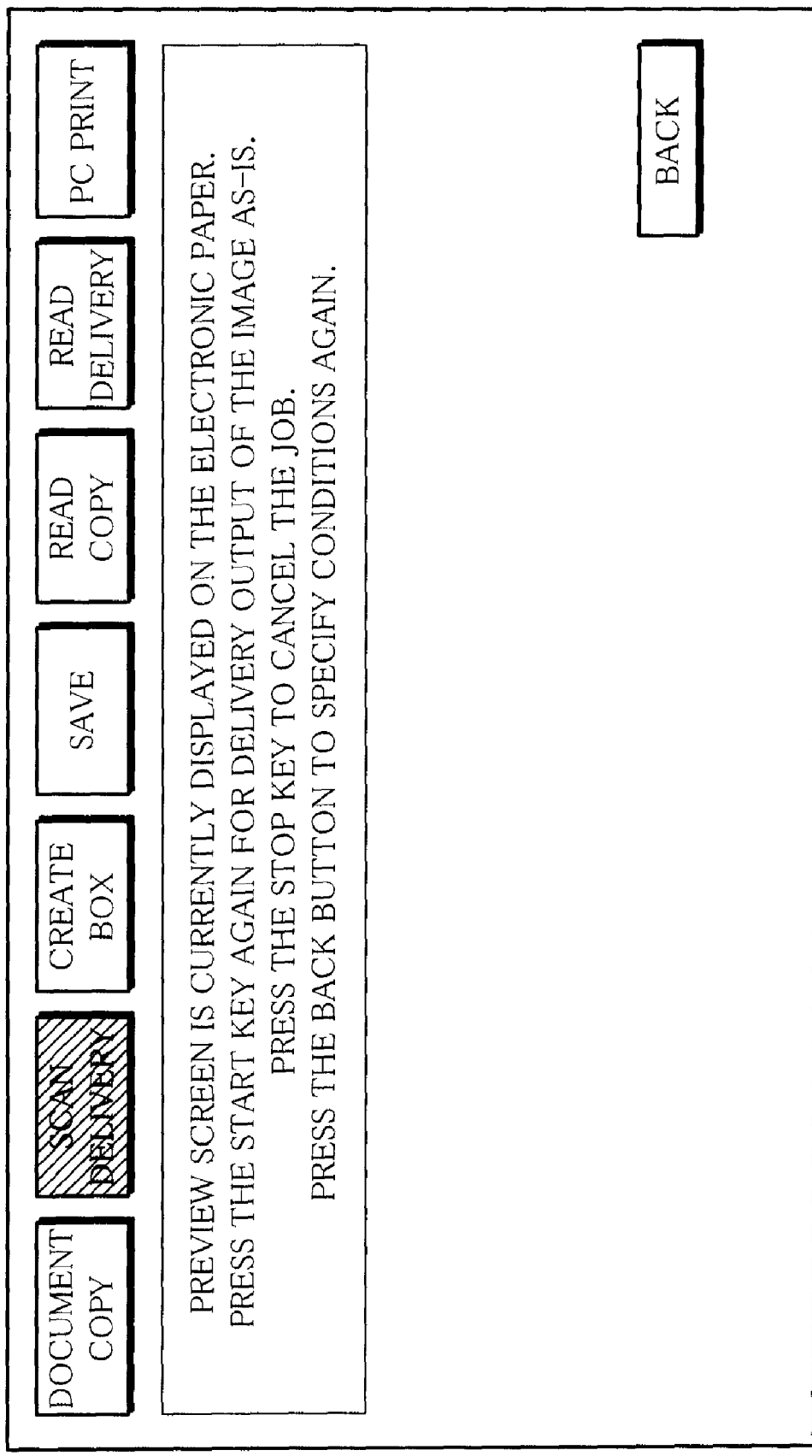
FIG. 13 is a diagram illustrating an example of a preview notifying screen.

FIG. 12 is a diagram illustrating an example of a conditions specifying screen WN21, and FIG. 13 is a diagram illustrating an example of a preview notifying screen WN22.

A user places paper on which a document image is depicted on the document tray, and presses a "scan delivery" button on the top screen WN0 shown in FIG. 9.

Responding to this, the job execution conditions receiving portion 102 displays the conditions specifying screen WN21 as shown in FIG. 12. The user specifies desired conditions by pressing corresponding buttons on the conditions specifying screen WN21. In the case where the user intends to confirm an image on the electronic paper 4 before a process for delivering image data is started, he/she performs the process for preparing a preview screen as described earlier.

After specifying the conditions and preparing the preview screen if necessary, the user presses the start key.

Responding to this operation, the job execution conditions receiving portion 102 receives, as a job type, the "scan delivery job", and, as conditions, the details specified on the conditions specifying screen WN21.

If the "YES" button is pressed on the conditions specifying screen WN21, then the preview display processing portion 103 causes the scanner 10e to pre-scan an image depicted on paper placed thereon. Thereby, image data of an image to be delivered is obtained. Further, the preview display processing portion 103 converts the image data in accordance with the conditions received. For example, in the case where a color document is scanned at a scan resolution of 600 dpi, and "monochrome", "200 dpi", and "TIFF" are specified as the conditions, the preview display processing portion 103 converts the image data into image data whose color is monochrome, whose resolution is "200 dpi", and whose format is Tagged Image File Format (TIFF).

The preview display processing portion 103, then, displays the image on the electronic paper 4 based on the image data obtained as a result of the conversion.

At this time, the preview display processing portion 103 displays the preview notifying screen WN22 as shown in FIG. 13 on the touchscreen 10h1.

As with the case of the document copy job, the user determines whether or not to execute the job while viewing the image displayed on the electronic paper 4. If the user determines that the job is to be executed, then he/she presses the start key. If the user intends to specify the conditions again, then he/she presses the "BACK" button.

When the start key is pressed, the job execution control portion 101 controls the network interface 10g or the like in such a manner that the image data obtained as a result of the conversion in accordance with the specified conditions is transmitted to the specified destination. Image data may be newly obtained and the new image data may be used, or image data obtained by pre-scanning may be used.

As described above, the job history managing portion 104 generates a summary record RA and a job details record RC for the job, and stores the summary record RA and the job details record RC respectively in the job summary table TB1 and the delivery job details table TB3 (see FIG. 8).

As with the case of the document copy job, the identification information write processing portion 106 associates the MFP ID of the subject image forming apparatus 1 with the job ID of the job, and writes the resultant into the nonvolatile memory 40b of the electronic paper 4.

The image data obtained by the scanner 10e is associated with the job ID, and stored in the scan data saving portion 143.

Case C: Case Where a New Job is a PC Print Job

Figure 15:
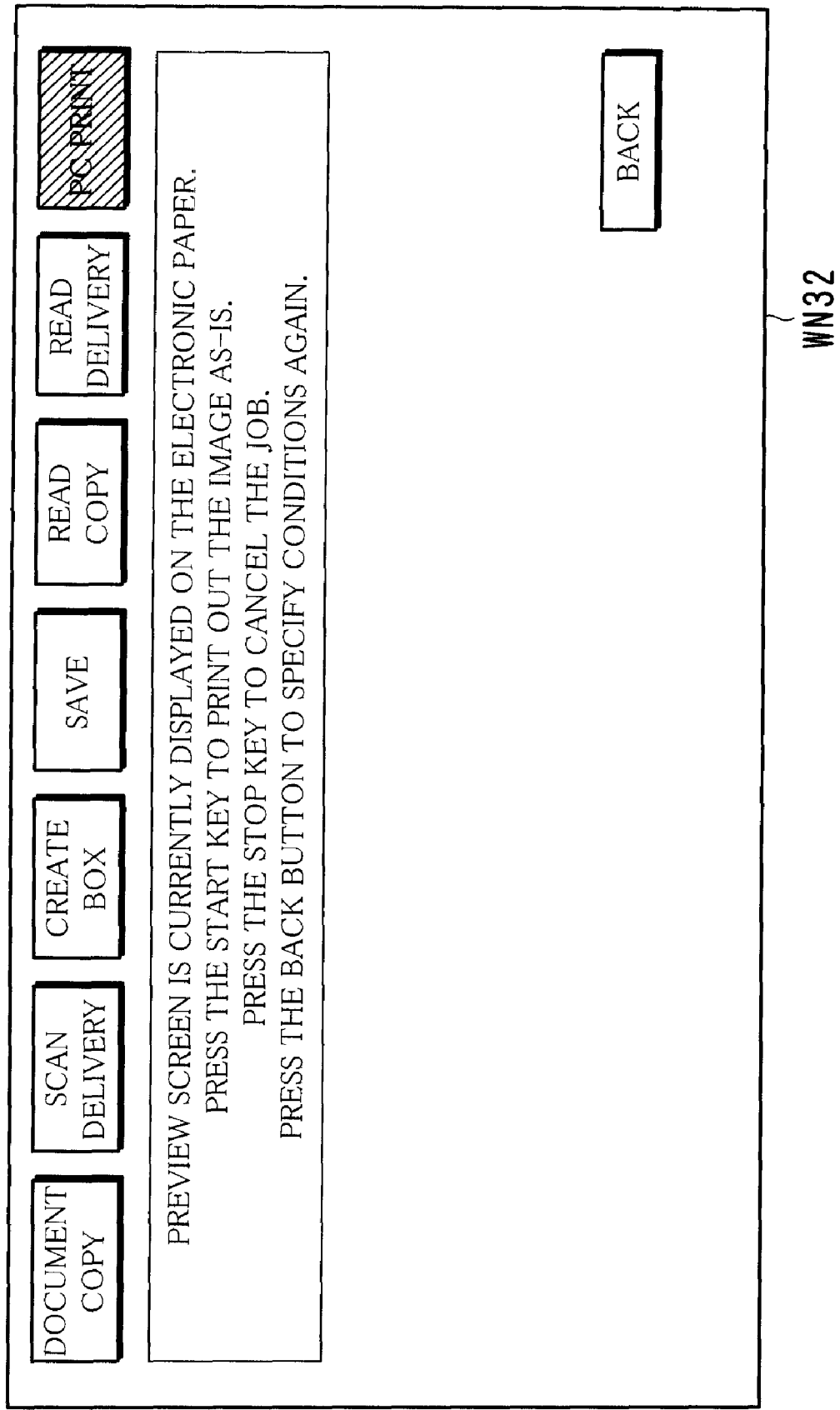
FIG. 15 is a diagram illustrating an example of a preview notifying screen.
Figure 16:
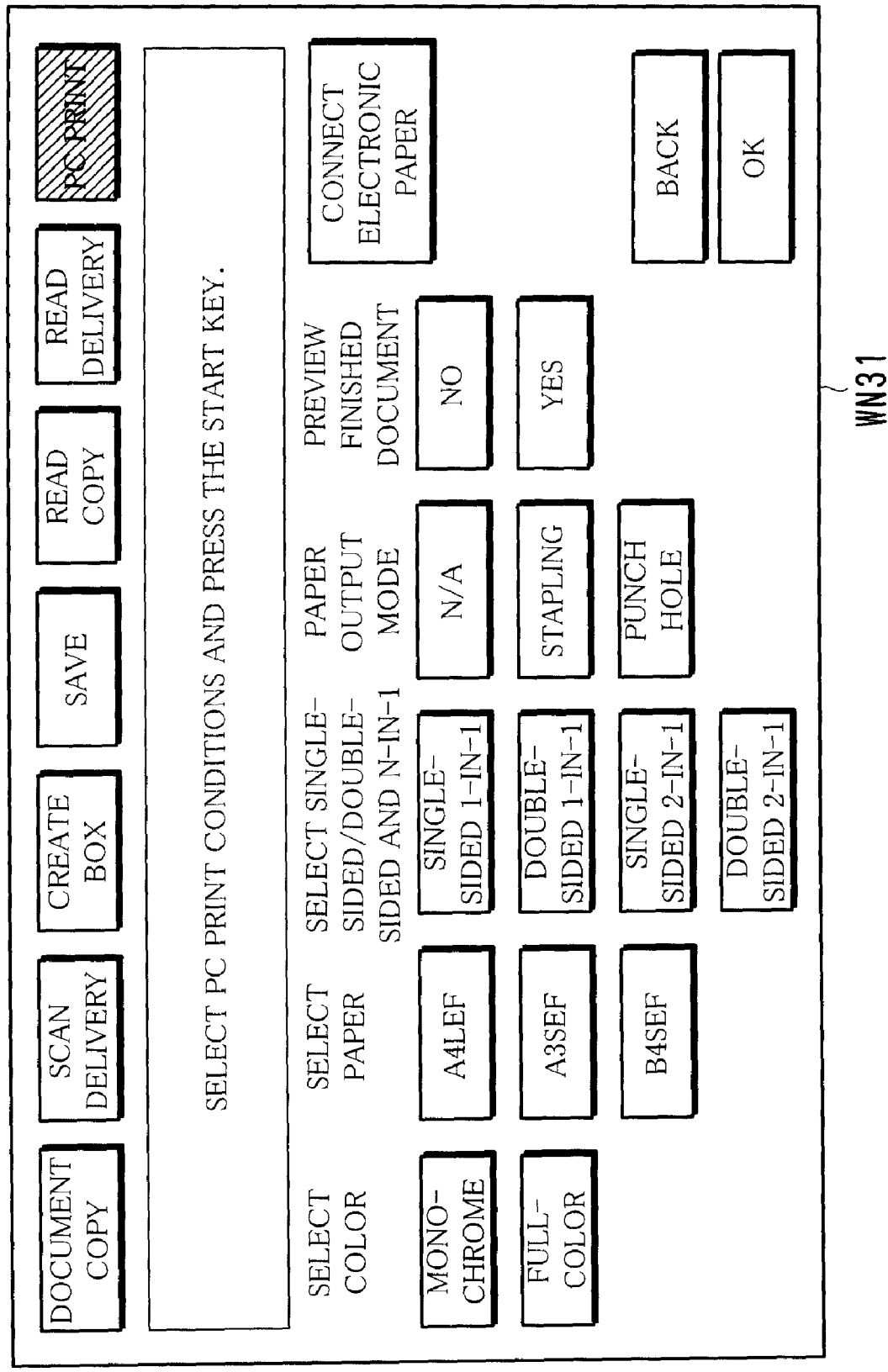
FIG. 16 is a diagram illustrating an example of a conditions specifying screen.

FIG. 14 is a diagram illustrating an example of a conditions specifying screen WN30; FIG. 15 is a diagram illustrating an example of a preview notifying screen WN32; and FIG. 16 is a diagram illustrating an example of a conditions specifying screen WN31.

A user prepares image data of an image to be printed in any of the terminals 2, e.g., the terminal 2A. The user may prepare the image data by creating a document using an application such as word processing software or drawing software installed on the terminal 2. The user may prepare the image data by using a WEB browser to download WEB page data from a server on the Internet.

The user uses the application to open the image data prepared, and enters a predetermined command. Responding to this operation, the terminal 2 displays the conditions specifying screen WN30 as shown in FIG. 14 which is a so-called print dialogue box. As with the case of the document copy job, the user specifies desired conditions on the conditions specifying screen WN30, and determines whether or not to display a preview screen on the electronic paper 4. The user further specifies an image forming apparatus 1 used to execute the job.

The terminal 2 converts, if necessary, the format of the prepared image data into a format corresponding to the specified image forming apparatus 1, e.g., a page description language format such as PostScript. The terminal 2 then transmits the resultant image data to the specified image forming apparatus 1 together with conditions information indicating the specified conditions and indicating whether or not to display a preview screen.

With the image forming apparatus 1, the job execution conditions receiving portion 102 receives the image data and the conditions information from the terminal 2.

The user goes to the site of the specified image forming apparatus 1 in order to obtain a printed matter. The user, then, connects the electronic paper 4 to the electronic paper interface 10j.

If the conditions information sent from the terminal 2 indicates that displaying a preview screen is necessary, then the preview display processing portion 103 constructs an image that is supposed to be obtained if the document is printed under the conditions indicated in the conditions information based on the image data sent from the terminal 2. The preview display processing portion 103, then, displays the constructed image on the electronic paper 4 connected to the image forming apparatus 1.

At this time, the preview display processing portion 103 displays the preview notifying screen WN32 as shown in FIG. 15 on the touchscreen 10h1.

As with the case of the document copy job, the user determines whether or not to execute the job while viewing the image displayed on the electronic paper 4. If the user determines that the job is to be executed, then he/she presses the start key. If the user intends to specify the conditions again, then he/she presses the "BACK" button.

When the start key is pressed, the job execution control portion 101 controls the printer 10f or the like in such a manner that the image is printed (copied) onto paper in accordance with the conditions specified in the conditions information sent from the terminal 2.

On the other hand, when the "BACK" button is pressed, the job execution conditions receiving portion 102 displays the conditions specifying screen WN31 as shown in FIG. 16 on the touchscreen 10h1. The conditions indicated in the conditions information sent from the terminal 2 are reflected in the conditions specifying screen WN31. The user can change the specified conditions to execute the job on the conditions specifying screen WN31. If the "YES" button is selected and the start key is pressed, then the preview display processing portion 103 displays an image once again on the electronic paper 4 based on the changed conditions, and displays the preview notifying screen WN32 on the touchscreen 10h1 once again.

As described above, the job history managing portion 104 generates a summary record RA and a job details record RB for the job, and stores the summary record RA and the job details record RB respectively in the job summary table TB1 and the print job details table TB2.

As with the case of the document copy job, the identification information write processing portion 106 associates the MFP ID of the subject image forming apparatus 1 with the job ID of the job, and writes the resultant into the nonvolatile memory 40b of the electronic paper 4.

The image data sent from the terminal 2 is associated with the job ID, and stored in the scan data saving portion 143.

Case D: Case Where a New Job is a Read Copy Job

Figure 17:
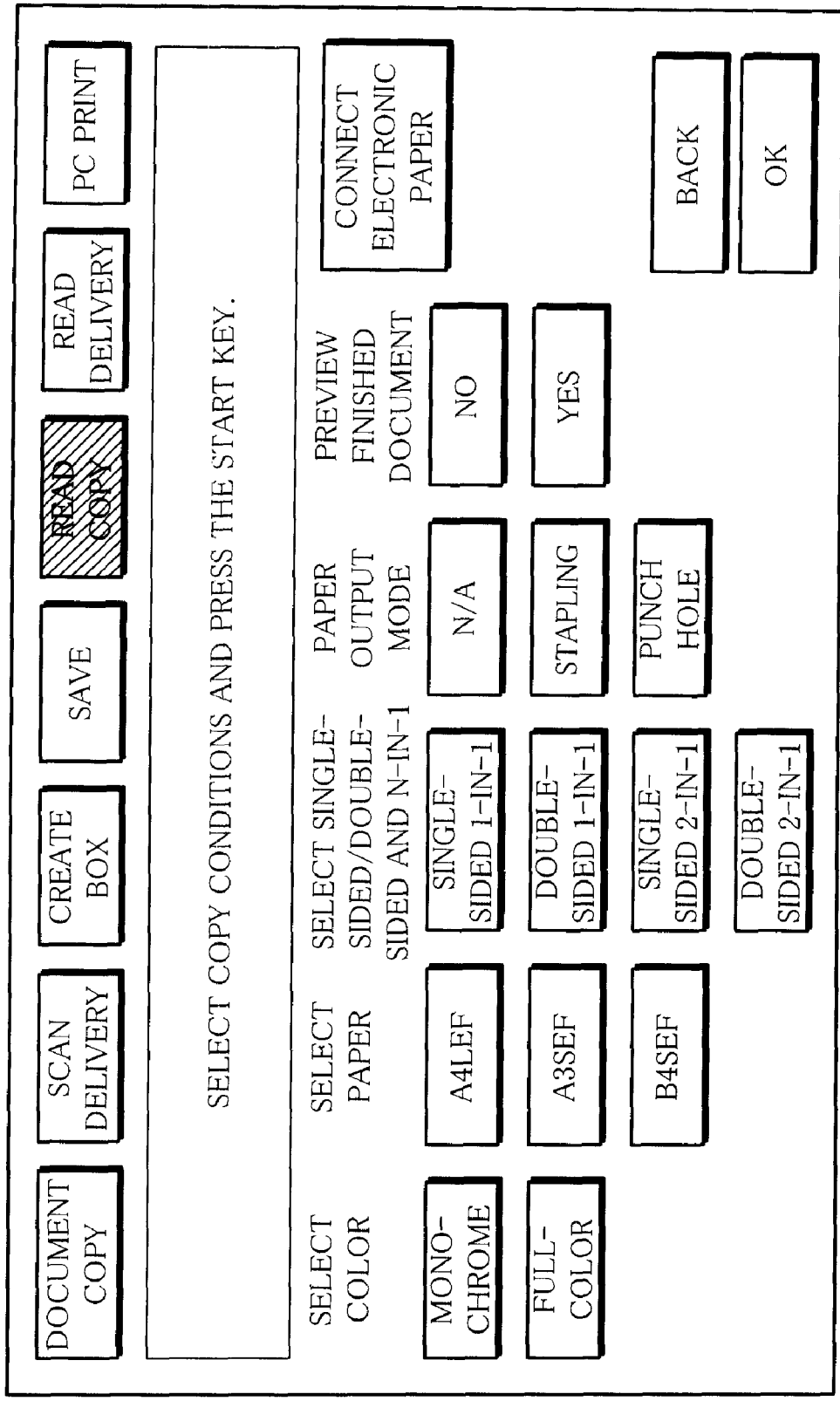
FIG. 17 is a diagram illustrating an example of a conditions specifying screen.
Figure 18:
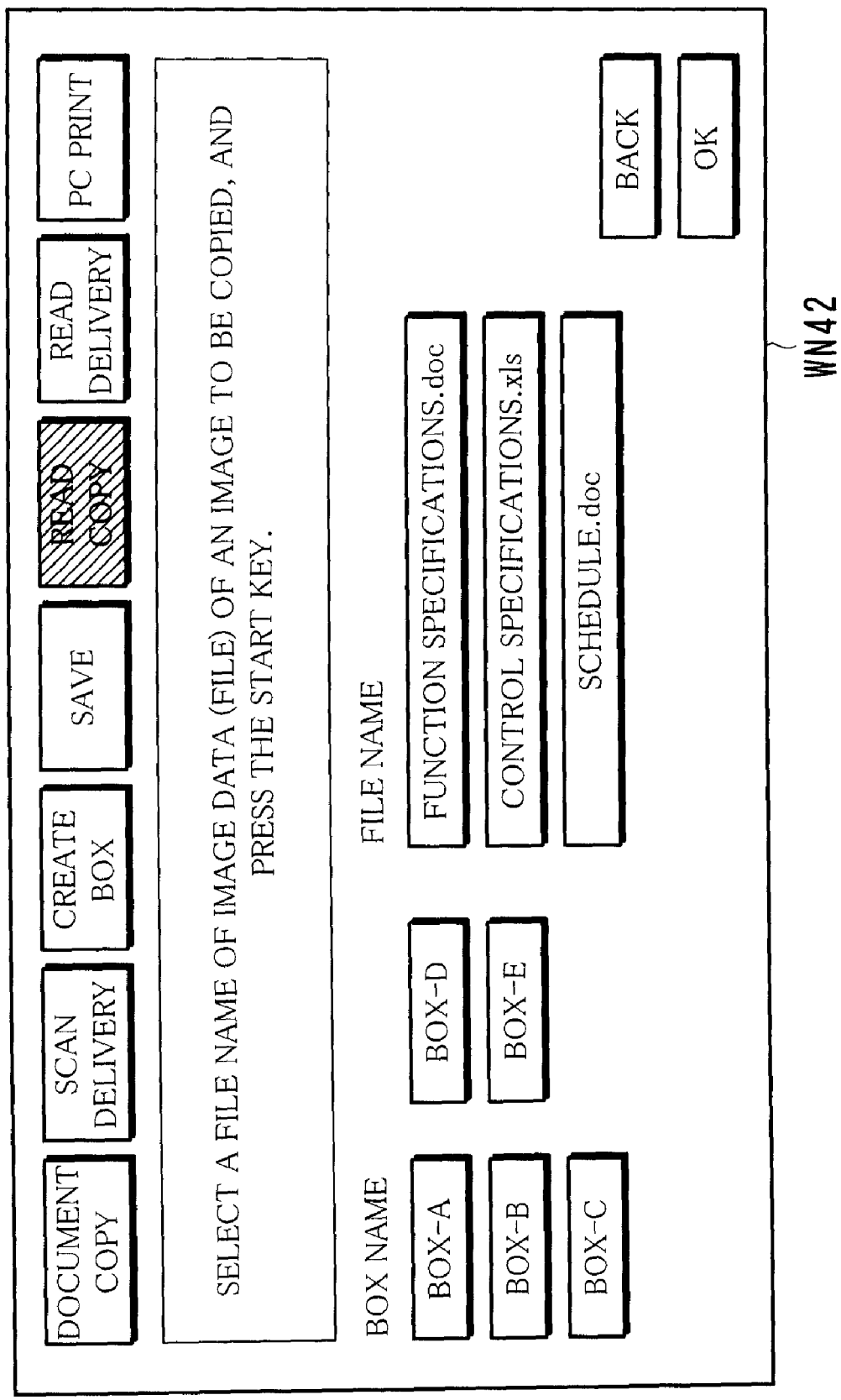
FIG. 18 is a diagram illustrating an example of an output target specifying screen.
Figure 19:
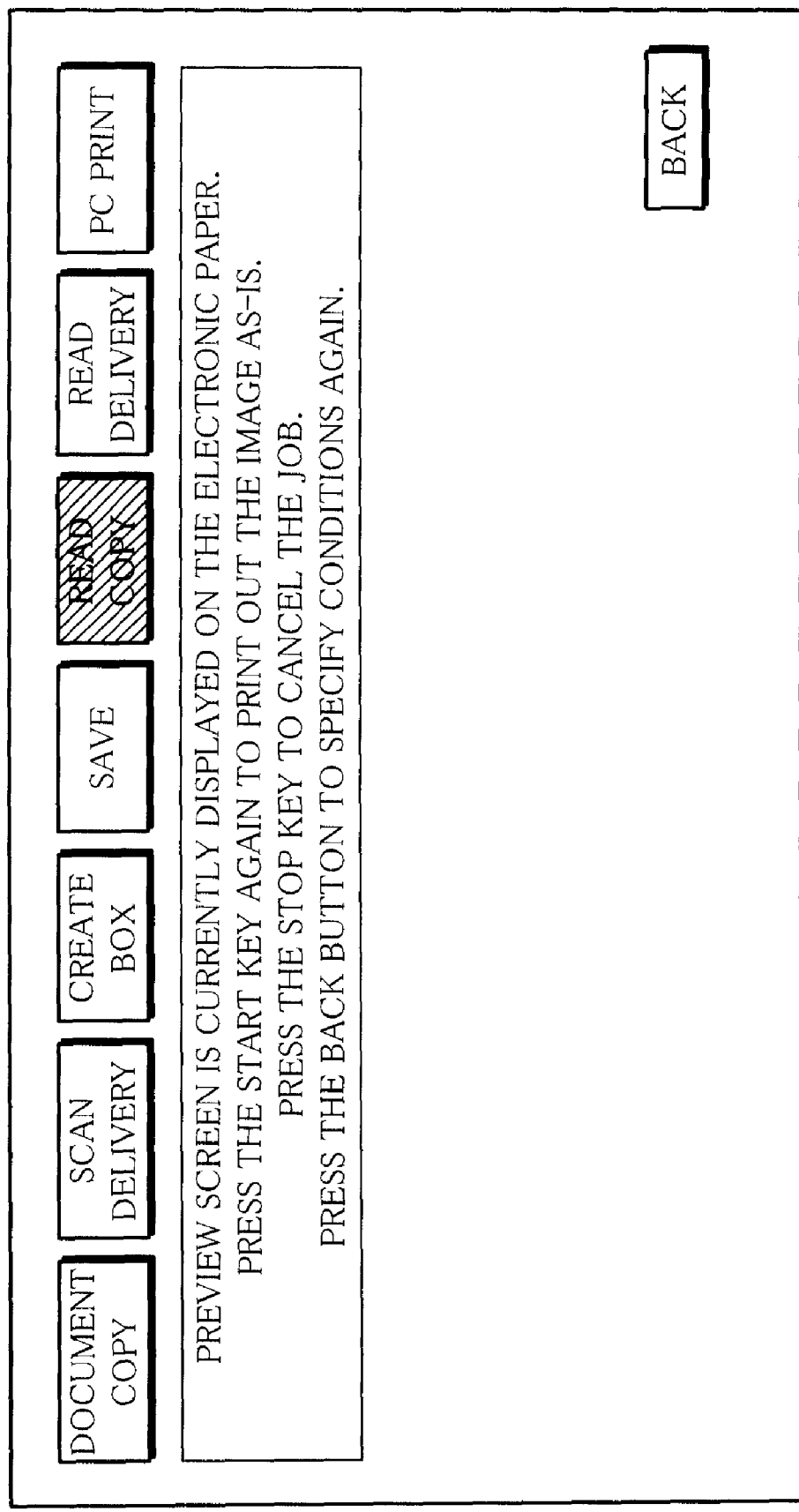
FIG. 19 is a diagram illustrating an example of a preview notifying screen.

FIG. 17 is a diagram illustrating an example of a conditions specifying screen WN41; FIG. 18 is a diagram illustrating an example of an output target specifying screen WN42; and FIG. 19 is a diagram illustrating an example of a preview notifying screen WN43.

A user presses a "read copy" button on the top screen WN0 shown in FIG. 9.

Responding to this, the job execution conditions receiving portion 102 displays the conditions specifying screen WN41 as shown in FIG. 17. The user specifies desired conditions by pressing corresponding buttons on the conditions specifying screen WN41. In the case where the user intends to confirm an image on the electronic paper 4 before the image is printed onto paper, he/she performs the process for preparing a preview screen as described earlier. The user, then, presses the "OK" button.

Responding to this operation, the job execution conditions receiving portion 102 displays the output target specifying screen WN42 as shown in FIG. 18. The output target specifying screen WN42 is a screen for the user to select a file (image data) saved in a box. A list of boxes contained in the box information database 142 is provided on the left side of the output target specifying screen WN42. If any of the boxes is selected, a list of file names of files (image data) saved in the selected box is displayed in the middle of the output target specifying screen WN42. The user performs operation on the output target specifying screen WN42 to search for image data of an image to be printed, and selects the image data found by the search. The user, then, presses the start key.

Responding to this operation, the job execution conditions receiving portion 102 receives, as a job type, the "read copy job", and, as conditions, the details specified on the conditions specifying screen WN41.

If the "YES" button is pressed on the conditions specifying screen WN41, then the preview display processing portion 103 reads out the image data selected on the output target specifying screen WN42 from a box, and, based on the image data, constructs an image that is supposed to be obtained if the document is printed under the specified conditions. The preview display processing portion 103, then, displays the constructed image on the electronic paper 4 connected to the image forming apparatus 1.

At this time, the preview display processing portion 103 displays the preview notifying screen WN43 as shown in FIG. 19 on the touchscreen 10h1.

As with the case of the document copy job, the user determines whether or not to execute the job while viewing the image displayed on the electronic paper 4. If the user determines that the job is to be executed, then he/she presses the start key. If the user intends to specify the conditions again, then he/she presses the "BACK" button.

When the start key is pressed, the job execution control portion 101 controls the printer 10f or the like in such a manner that the image is printed (copied) onto paper in accordance with the specified conditions based on the image data read out.

As described above, the job history managing portion 104 generates a summary record RA and a job details record RB for the job, and stores the summary record RA and the job details record RB respectively in the job summary table TB1 and the print job details table TB2.

As with the case of the document copy job, the identification information write processing portion 106 associates the MFP ID of the subject image forming apparatus 1 with the job ID of the job, and writes the resultant into the nonvolatile memory 40b of the electronic paper 4.

Case E: Case Where a New Job is a Read Delivery Job

Figure 20:
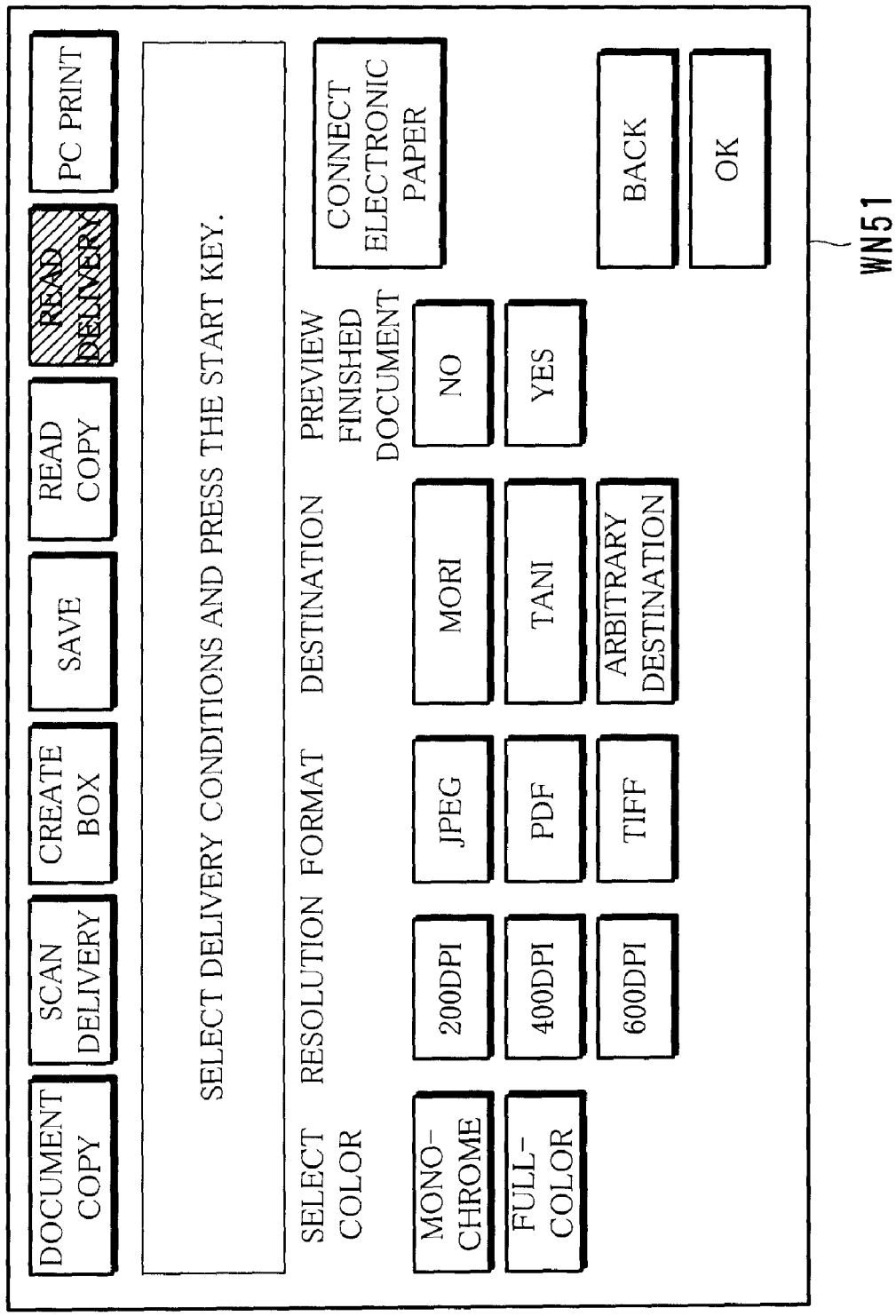
FIG. 20 is a diagram illustrating an example of a conditions specifying screen.
Figure 21:
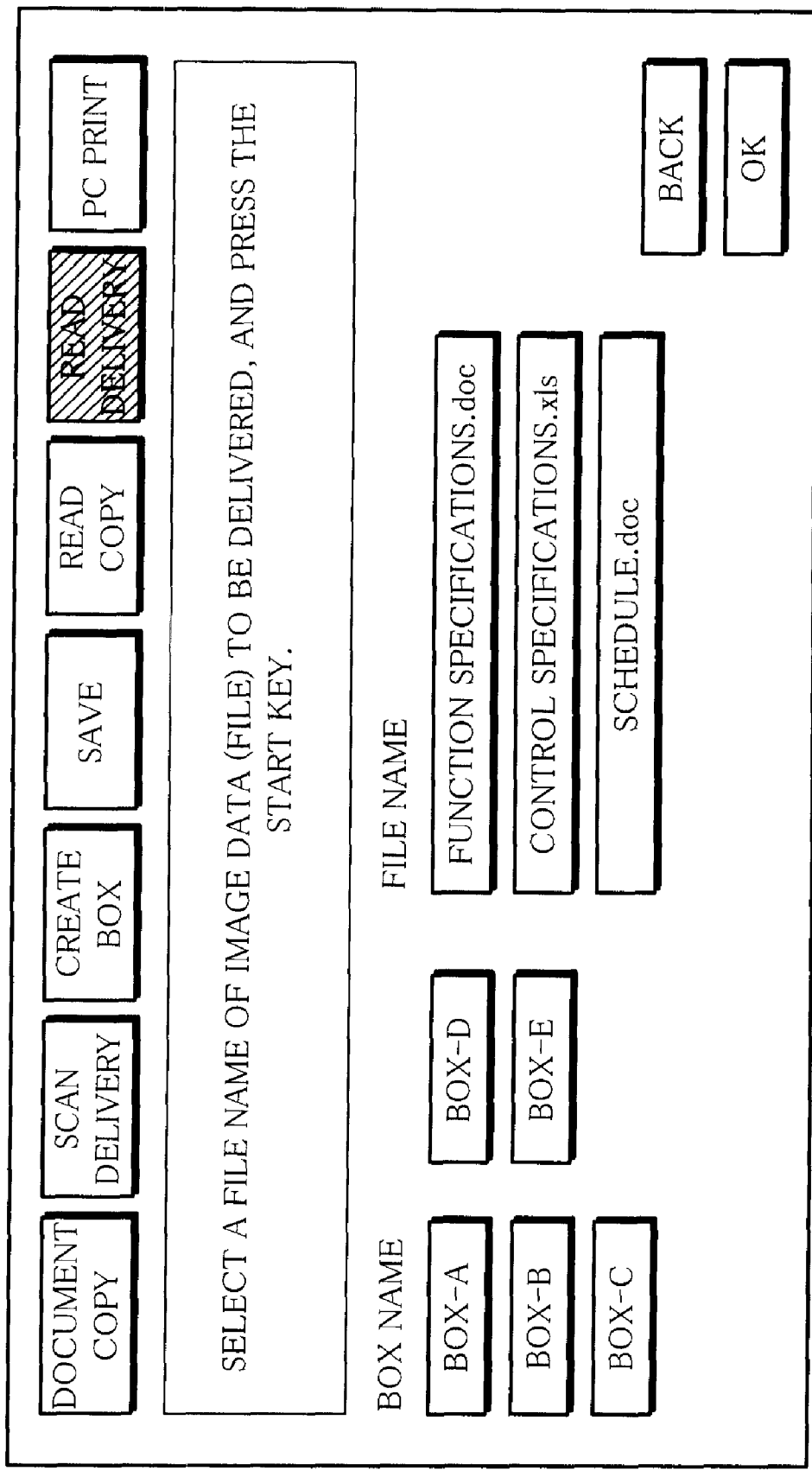
FIG. 21 is a diagram illustrating an example of an output target specifying screen.
Figure 22:
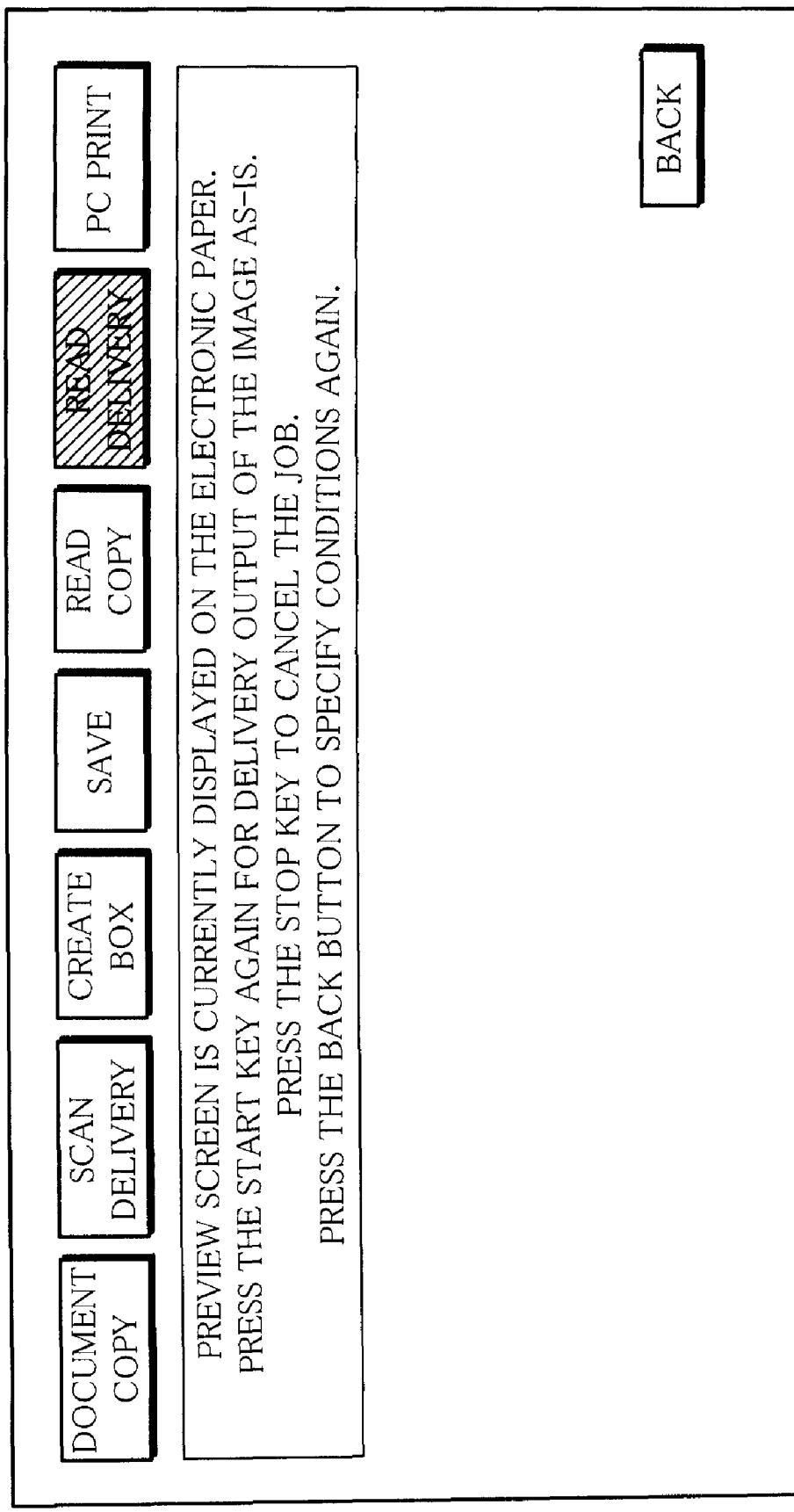
FIG. 22 is a diagram illustrating an example of a preview notifying screen.

FIG. 20 is a diagram illustrating an example of a conditions specifying screen WN51; FIG. 21 is a diagram illustrating an example of an output target specifying screen WN52; and FIG. 22 is a diagram illustrating an example of a preview notifying screen WN53.

A user presses a "read delivery" button on the top screen WN0 shown in FIG. 9.

Responding to this, the job execution conditions receiving portion 102 displays the conditions specifying screen WN51 as shown in FIG. 20. The user specifies desired conditions by pressing corresponding buttons on the conditions specifying screen WN51. In the case where the user intends to confirm an image on the electronic paper 4 before the image is printed onto paper, he/she performs the process for preparing a preview screen as described earlier. The user, then, presses the "OK" button.

Responding to this, the job execution conditions receiving portion 102 displays the output target specifying screen WN52 as shown in FIG. 21. The structure and the function of the output target specifying screen WN52 are the same as those of the output target specifying screen WN42 shown in FIG. 18. The user performs operation on the output target specifying screen WN52 to select image data to be delivered. The user, then, presses the start key.

If the "YES" button is selected on the conditions specifying screen WN51, then the preview display processing portion 103 reads out the image data selected on the output target specifying screen WN52 from a box. The preview display processing portion 103 converts the image data in accordance with the received conditions.

The preview display processing portion 103, then, displays the image on the electronic paper 4 based on the image data obtained as a result of the conversion.

At this time, the preview display processing portion 103 displays the preview notifying screen WN53 as shown in FIG. 22 on the touchscreen 10h1.

As with the case of the document copy job, the user determines whether or not to execute the job while viewing the image displayed on the electronic paper 4. If the user determines that the job is to be executed, then he/she presses the start key. If the user intends to specify the conditions again, then he/she presses the "BACK" button.

When the start key is pressed, the job execution control portion 101 controls the network interface 10g or the like in such a manner that the image data obtained as a result of the conversion in accordance with the specified conditions is transmitted to the specified destination.

As described above, the job history managing portion 104 generates a summary record RA and a job details record RC for the job, and stores the summary record RA and the job details record RC respectively in the job summary table TB1 and the delivery job details table TB3.

As with the case of the document copy job, the identification information write processing portion 106 associates the MFP ID of the subject image forming apparatus 1 with the job ID of the job, and writes the resultant into the nonvolatile memory 40b of the electronic paper 4.

According to Case A through Case E discussed above, at a time when a job is executed, the job history managing portion 104 and the identification information write processing portion 106 save the summary record RA, and the job details record RB or RC into the job history information database 141, save the image data into the scan data saving portion 143, and save a pair of the MFP ID and the job ID into the electronic paper 4. Instead, however, the job history managing portion 104 and the identification information write processing portion 106 may save them at a time when a preview screen is displayed.

For example, it is sometimes a case where a user specifies conditions or the like to cause the image forming apparatus 1A to execute a read delivery job, and causes the electronic paper 4 to display a preview screen thereon; however, the user suspends the execution of the job and leaves the site of the image forming apparatus 1A because he/she wishes to take time to consider whether or not a desired image is to be obtained. In such a case, the image forming apparatus 1A saves, therein, the summary record RA of the job suspended or the like and writes a pair of the MFP ID and the job ID for the suspended job into the electronic paper 4. This makes it possible to easily execute the suspended job later. The following is a description of a method for performing such operation.

[Case Where a Previous Job is Executed Using the Electronic Paper 4]

Figure 23:
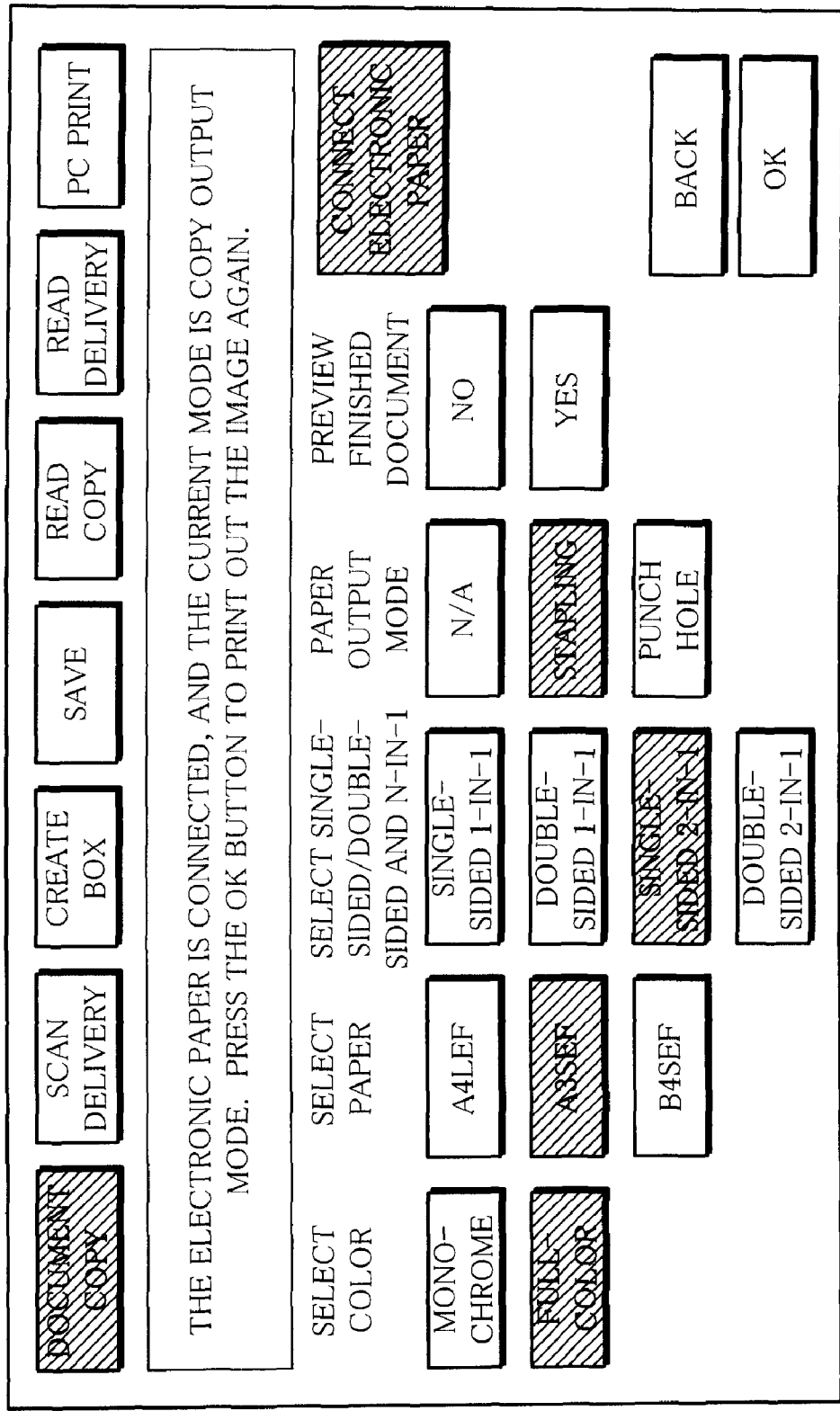
FIG. 23 is a diagram illustrating an example of a conditions specifying screen.
Figure 24:
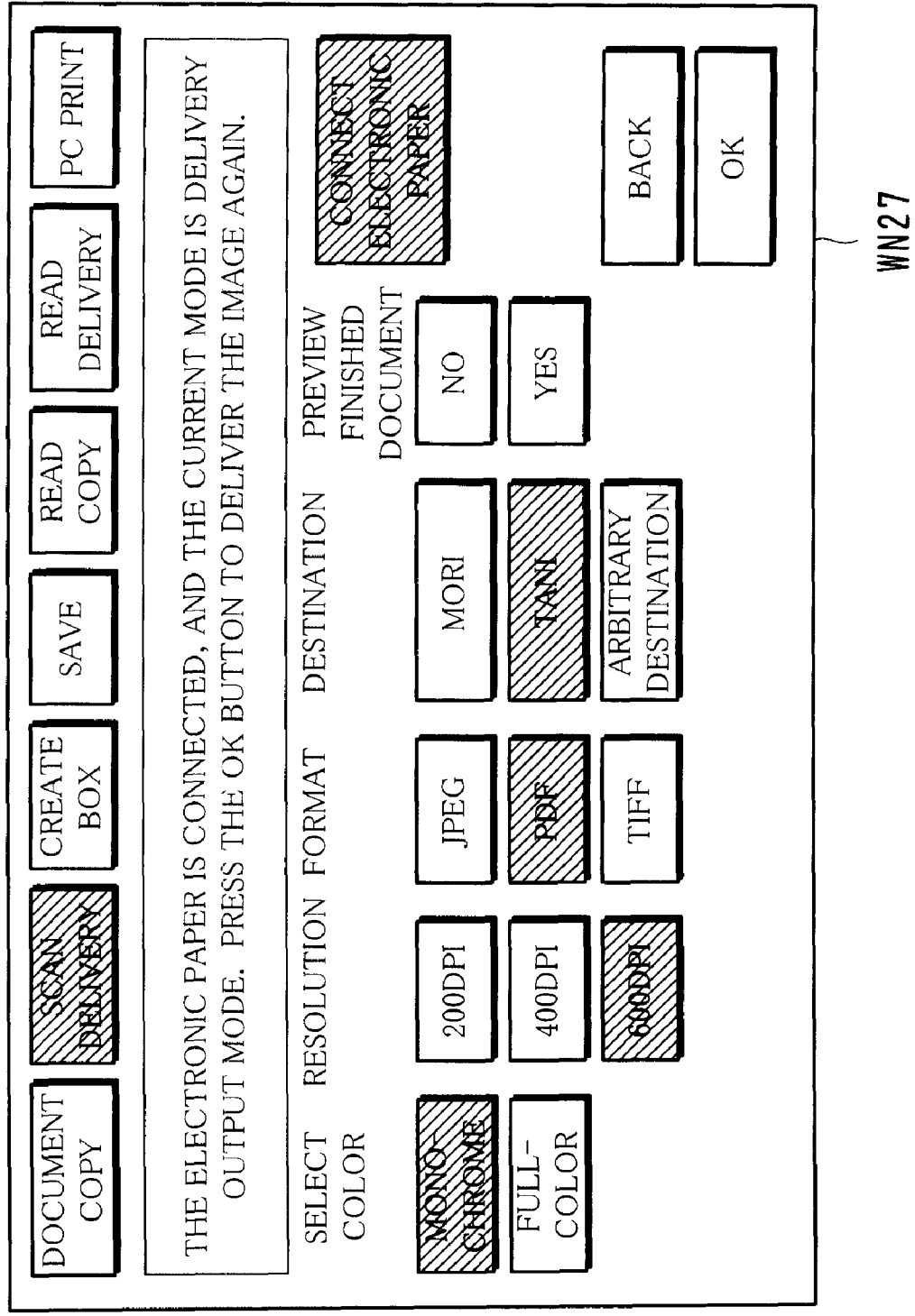
FIG. 24 is a diagram illustrating an example of a conditions specifying screen.
Figure 25:
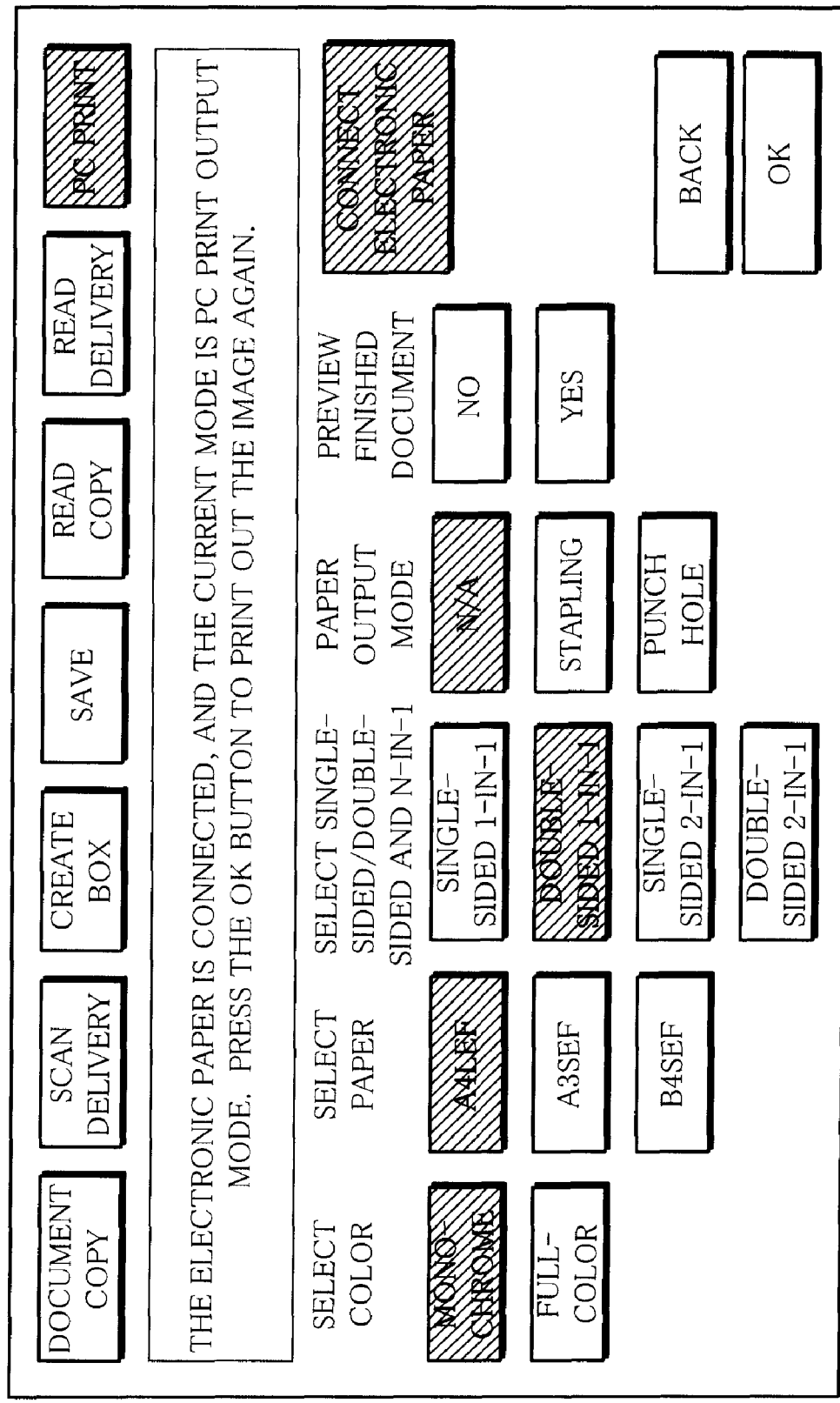
FIG. 25 is a diagram illustrating an example of a conditions specifying screen.
Figure 29:
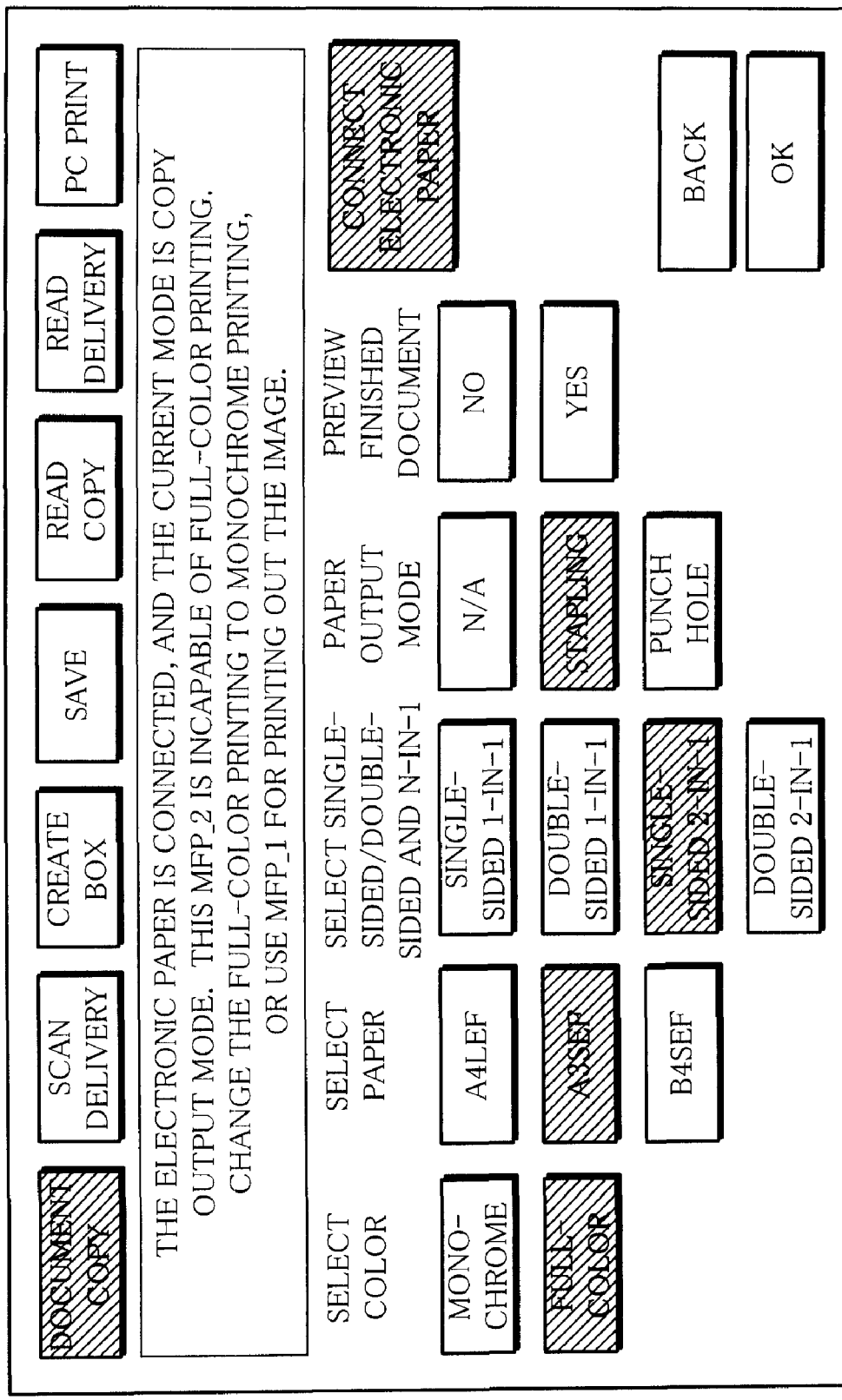
FIG. 29 is a diagram illustrating an example of a conditions specifying screen.

FIG. 23 is a diagram illustrating an example of a conditions specifying screen WN17; FIG. 24 is a diagram illustrating an example of a conditions specifying screen WN27; FIG. 25 is a diagram illustrating an example of a conditions specifying screen WN37; FIG. 26 is a diagram illustrating a modification of the job summary table TB1; FIG. 27 is a diagram illustrating a modification of the print job details table TB2; FIG. 28 is a diagram illustrating a modification of the delivery job details table TB3; and FIG. 29 is a diagram illustrating an example of a conditions specifying screen WN17'.

As described earlier, before a user causes the image forming apparatus 1 to execute a job, the user can view a preview screen and confirm in what way an image is to be obtained based on the job. When a new job is executed or a preview screen for the new job is displayed on the electronic paper 4, the summary record RA, and the job details record RB or RC for the new job are recorded in the job history information database 141 (see FIGS. 6, 7, and 8). Further, the electronic paper 4 records, therein, a pair of the job ID of the job and the MFP ID of the image forming apparatus 1 that has executed the job.

The user can use another image forming apparatus 1 to output an image displayed on the electronic paper 4. Referring to FIG. 1, for example, the user displays a preview screen on the electronic paper 4 before causing the image forming apparatus 1A to execute a job. Then, the user can cause another image forming apparatus 1, e.g., the image forming apparatus 1B to execute the job.

A description is given below of operation performed by the user and processes performed by the individual portions of the image forming apparatus 1 shown in FIG. 4, taking an example in which the image forming apparatus 1B is caused to execute the entire or a part of a job that has been executed (or is to be executed) by the image forming apparatus 1A.

The user operates the image forming apparatus 1A to view a preview screen displayed on the electronic paper 4 in order to confirm the finishing of an image. The user, then, goes to the site of the image forming apparatus 1B and performs predetermined operation thereon, e.g., presses the "electronic paper" button of FIG. 9. The user, then, connects the electronic paper 4 to the electronic paper interface 10j of the image forming apparatus 1B.

Responding to this operation, an identification information acquisition processing portion 121 of the image forming apparatus 1B reads out a pair of an MFP ID and a job ID from the nonvolatile memory 40b (see FIG. 5) of the electronic paper 4 connected to the electronic paper interface 10j, and obtains the pair of an MFP ID and a job ID.

A job data receiving portion 122 of the image forming apparatus 1B communicates with the image forming apparatus 1 assigned the MFP ID, i.e., the image forming apparatus 1A in this example, to request the same for information on the job ID, and receives the same.

With the image forming apparatus 1A, when the request is received from the image forming apparatus 1B, the job data transmission portion 131 provides the image forming apparatus 1B with data necessary to execute the job in the following manner.

The job data transmission portion 131 reads out a summary record RA, and a job details record RB or RC including the job ID from the job history information database 141, and sends the summary record RA, and the job details record RB or RC thus read out to the request source, i.e., the image forming apparatus 1B in this example.

If the summary record RA includes a box name and a file name, then the job data transmission portion 131 reads out a file (image data) given the file name from a box given the box name, and sends the file read out to the image forming apparatus 1B. Alternatively, if the scan data saving portion 143 saves, therein, image data associated with the job ID, then the image data is read out and sent to the image forming apparatus 1B.

With the image forming apparatus 1B, when the summary record RA, and the like are received, the job execution conditions receiving portion 102 performs a process for receiving conditions for a job to be executed.

The job execution conditions receiving portion 102 displays a screen on which conditions are to be specified again based on an application name (a job type) indicated in the summary record RA, and conditions indicated in the job details record RB or RC, each of which is received from the image forming apparatus 1A.

In the case where, for example, an application name indicated in the summary record RA is a "document copy job", the job execution conditions receiving portion 102 displays the conditions specifying screen WN17 as shown in FIG. 23 in which conditions indicated in the job details record RB are reflected.

Alternatively, in the case where an application name indicated in the summary record RA is a "scan delivery job", the job execution conditions receiving portion 102 displays the conditions specifying screen WN27 as shown in FIG. 24 in which conditions indicated in the job details record RC are reflected.

Alternatively, in the case where an application name indicated in the summary record RA is a "PC print job", the execution conditions receiving portion 102 displays the conditions specifying screen WN37 as shown in FIG. 25 in which conditions indicated in the job details record RB are reflected.

Alternatively, in the case where an application name indicated in the summary record RA is a "read copy job", the execution conditions receiving portion 102 displays a screen in which conditions indicated in the job details record RB are reflected. This screen is a screen on which conditions concerning printing are specified again, as with the conditions specifying screen WN17 as shown in FIG. 23. Yet alternatively, in the case where an application name indicated in the summary record RA is a "read delivery job", the execution conditions receiving portion 102 displays a screen in which conditions indicated in the job details record RC are reflected. This screen is a screen on which conditions concerning delivery of image data are specified again, as with the conditions specifying screen WN27 as shown in FIG. 24. Yet alternatively, in the case where an application name indicated in the summary record RA is either the "read copy job" or the "read delivery job", the execution conditions receiving portion 102 displays, subsequent to the indication of the conditions specifying screen WN17 or the conditions specifying screen WN27, a screen for specifying again image data of an image to be processed in accordance with a command issued by the user. The screen for specifying again image data is similar to the output target specifying screen WN42 shown in FIG. 18.

The user performs change operation on these screens, so that the conditions are specified again and changed to new conditions. In the case where the user intends to maintain the current conditions, he/she does not perform any such change operation. This retains the current conditions specified in the image forming apparatus 1.

The execution conditions receiving portion 102 receives the conditions specified by the user on these screens. The user can also confirm the preview screen displayed on the electronic paper 4. The process for displaying the preview screen is as discussed earlier.

If the conditions are specified again, then the job execution control portion 101 causes the image forming apparatus 1 to execute the job based on the resulting new conditions. Otherwise, the job execution control portion 101 causes the image forming apparatus 1 to execute the job based on the current conditions, i.e., the conditions indicated in the summary record RA, the job details record RB or RC obtained from the image forming apparatus 1A. In any event, the job is executed using the image data obtained from the image forming apparatus 1A.

The job history managing portion 104 generates a summary record RA, and a job details record RB or RC for this job, and stores the summary record RA, the job details record RB, or the job details record RC respectively in the job summary table TB1, the print job details table TB2, or the delivery job details table TB3.

The identification information write processing portion 106 associates the MFP ID of the subject image forming apparatus 1 with the job ID of the job, and writes the resultant into the nonvolatile memory 40b of the electronic paper 4 via the electronic paper interface 10j.

The foregoing is the description of an example in which the image forming apparatus 1B executes a job executed by the image forming apparatus 1A; however, the image forming apparatus 1A can execute the job. In such a case, the user preferably connects the electronic paper 4 to the image forming apparatus 1A and performs the operation described above. The individual portions of the image forming apparatus 1A perform basically the same processes as those performed by the individual portions of the image forming apparatus 1B. Note, however, that the summary record RA, the job details record RB or RC, and the image data do not have to be received from another image forming apparatus 1, and instead, they are preferably read out from the job history information database 141, the box information database 142, and the scan data saving portion 143 of the subject image forming apparatus 1.

Another configuration is possible in which, when a job is executed based on an MFP ID and a job ID read out from the electronic paper 4, the summary record RA and the job details record RB or RC are not recorded on the database, or, the MFP ID of the image forming apparatus 1B and the job ID of the job are not recorded into the electronic paper 4.

Alternatively, such recording operation is performed only when conditions are specified again, and subsequently, a job is executed or a preview screen is displayed on the electronic paper 4. In such a case, the recording operation is performed as follows.

When the conditions are specified again, and subsequently, a job is executed or a preview screen is displayed, the job history managing portion 104 issues, as a job ID of the job, a job ID including a part of the job ID of the original job. Suppose that, for example, the image forming apparatus 1A executes a job whose job ID is "J0001", and after that the conditions for the job are changed to new conditions, and the image forming apparatus 1A executes the job based on the new conditions. In such a case, as shown in FIG. 26, it is possible to issue, as a job ID of the job executed based on the new conditions, "J0001_2", and to store the summary record RA in the job summary table TB1. The same is similarly applied to the job details record RB and the job details record RC, as shown in FIGS. 27 and 28.

In the meantime, it is possible that even if the image forming apparatus 1A can execute a job in accordance with conditions, the image forming apparatus 1B cannot execute the job in accordance with the conditions. Such a case is, for example, a case in which a document copy job of a color image is to be executed by the image forming apparatus 1A provided with a printer 10*f* having a color print function, and by the image forming apparatus 1B that does not have such a printer 10*f*.

Under such circumstances, if the electronic paper 4 is connected to the image forming apparatus 1B, then an execution conditions receiving portion 102 of the image forming apparatus 1B displays a screen for specifying conditions again together with a message indicating that the conditions include unprocessable conditions. For example, a screen for a document copy job, i.e., the conditions specifying screen WN17 shown in FIG. 23, may be displayed in such a way as the conditions specifying screen WN17' shown in FIG. 29. The user preferably changes only the unprocessable conditions to new conditions in accordance with the message. Alternatively, the initial image forming apparatus 1 (the image forming apparatus 1A in this example) is caused to execute the job.

Figure 30:
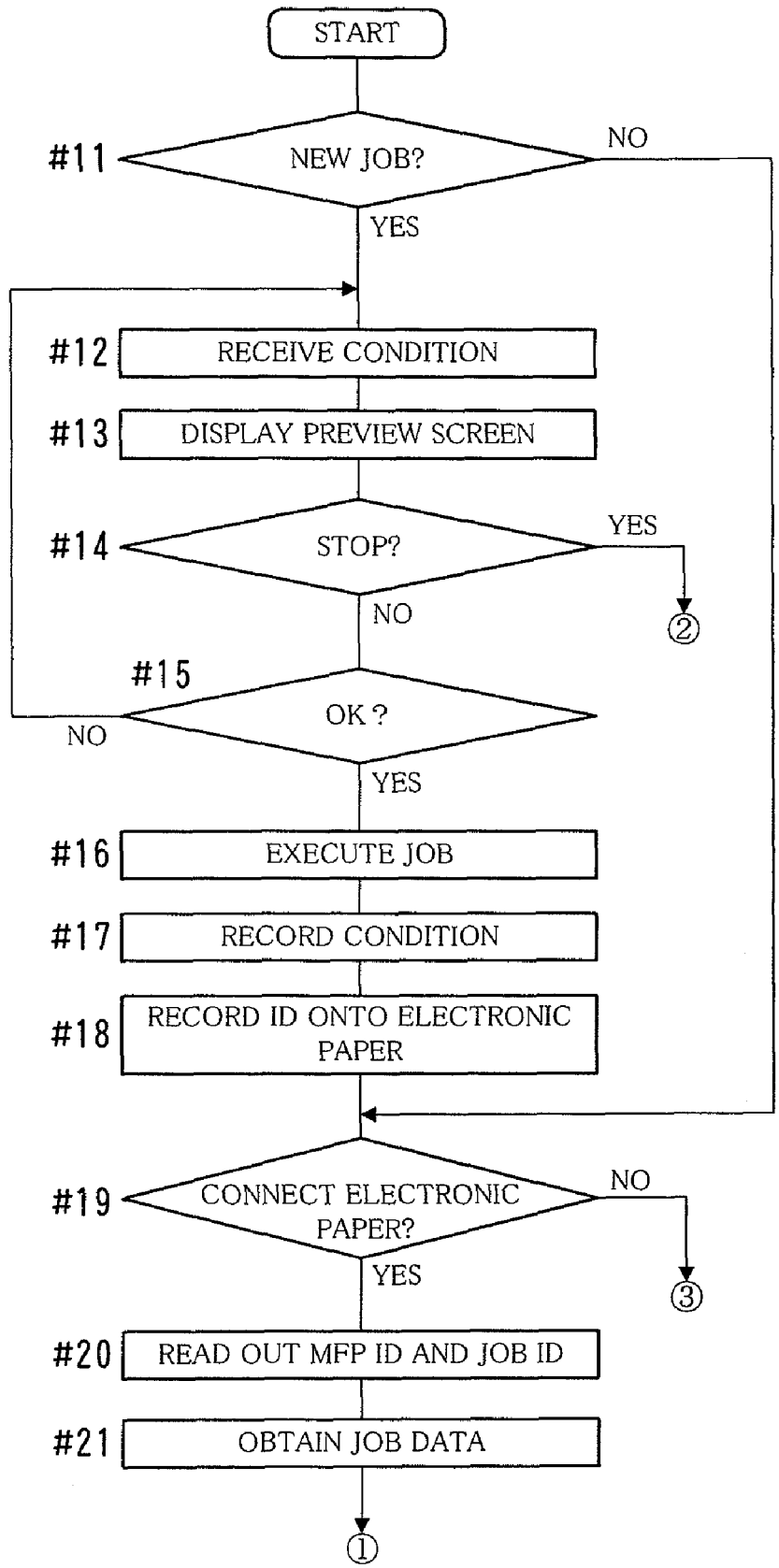
FIG. 30 is a flowchart depicting an example of the overall processing flow of an image forming apparatus.
Figure 31:
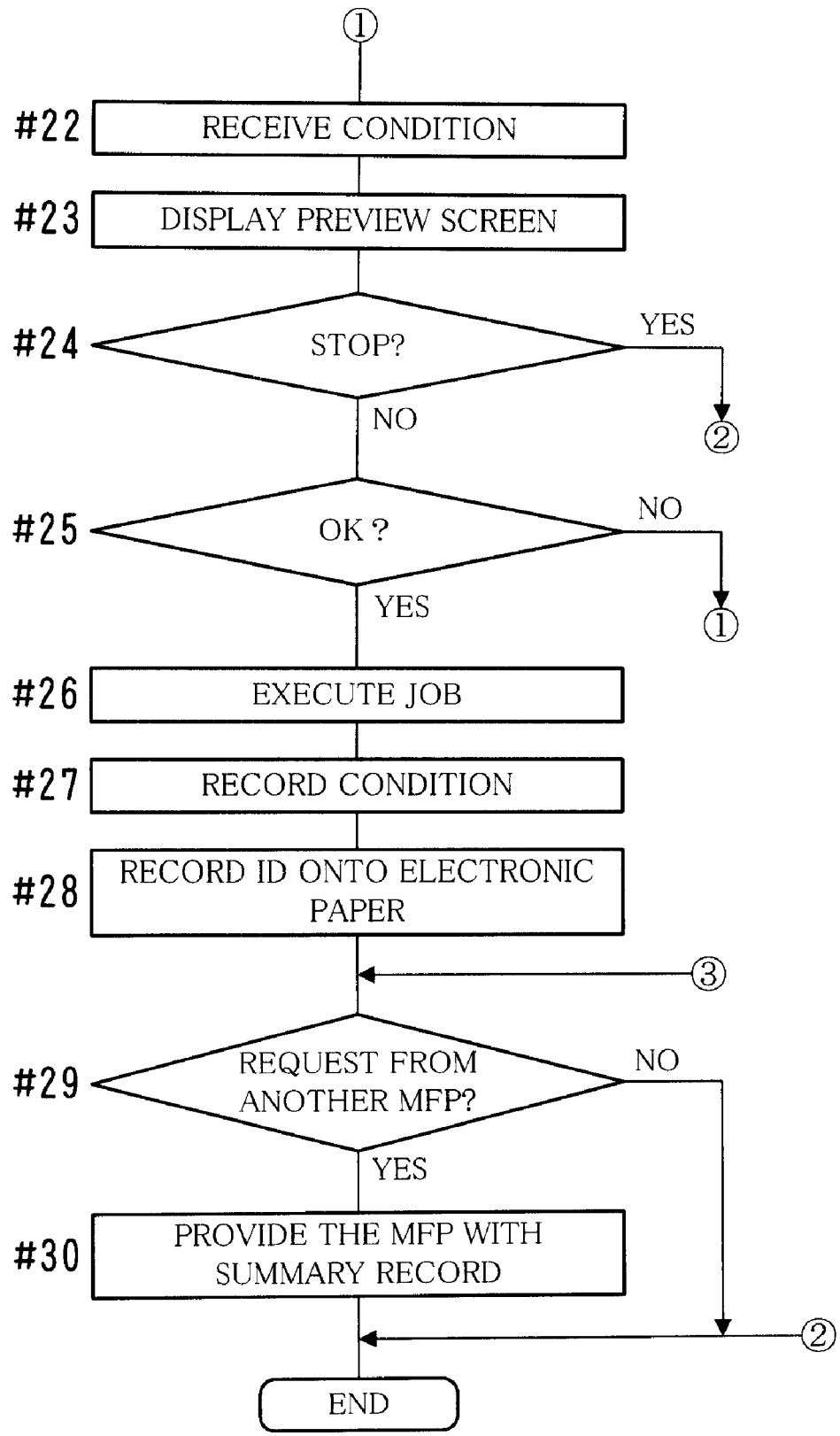
FIG. 31 is a flowchart depicting an example of the overall processing flow of an image forming apparatus.

FIGS. 30 and 31 are flowcharts depicting an example of the overall processing flow of the image forming apparatus 1.

The following is a description of the overall process steps for outputting an image performed by the image forming apparatus 1 with reference to the flowcharts of FIGS. 30 and 31. The CPU 10*a* of the image forming apparatus 1 executes the programs, so that the processes shown in the flowcharts are performed.

Every time an even occurs, the image forming apparatus 1 performs the following process in accordance with the event.

If a user presses a button corresponding to a job type (application name) on the top screen WN0 (see FIG. 9), then the image forming apparatus 1 finds that the user is to give a command to execute a new job (Yes in #11 of FIG. 30), displays any one of the conditions specifying screens WN11, WN21, WN41, and WN51 (see FIGS. 10, 12, 17, and 20) depending on the job type, and receives job conditions specified by the user (#12). Then, the image forming apparatus 1 displays a preview screen on the electronic paper 4 connected thereto by the user (#13).

Alternatively, if the image forming apparatus 1 receives image data and conditions information for a PC print job from the terminal 2 (Yes in #11, and Yes in #12), then the image forming apparatus 1 displays a preview screen on the electronic paper 4 connected thereto by the user who comes later to the site of the image forming apparatus 1 (#13).

The image forming apparatus 1 displays the preview notifying screen WN12, WN22, WN32, WN43, or WN53 (see FIG. 11, 13, 15, 19, or 22) on the touchscreen 10*h*1 in addition to displaying a preview screen on the electronic paper 4.

The user determines whether or not to execute the job while referring to the preview screen. The user presses the "BACK" button to specify the conditions again. Responding to this operation (No in #15), the image forming apparatus 1 displays the conditions specifying screen WN11, WN21, WN31 (see FIG. 16), WN41, or WN51 to receive change in the specified conditions (#12). Then, the image forming apparatus 1 displays a preview screen on the electronic paper 4 once again based on the resulting new conditions (#13).

If the user determines that the job is to be executed based on the specified conditions, then he/she presses the start key. Responding to this operation (Yes in #15), the image forming apparatus 1 executes the job in accordance with the specified conditions (#16). The image forming apparatus 1, then, generates a summary record RA, and a job details record RB or RC indicating the job conditions, and the like, saves the same, and also saves image data obtained as a result of scanning or image data sent from the terminal 2 (#17). The image forming apparatus 1 further writes a pair of the MFP ID of the subject image forming apparatus 1 and the job ID in the electronic paper 4 (#18).

However, in some case, the user does not determine promptly that a job is to be executed. In such a case, the user may suspend the execution of the job, remove the electronic paper 4 from the image forming apparatus 1 temporarily, and take time to consider whether or not to execute the job based on the specified conditions. When receiving a command to suspend the execution of the job from the user, the image forming apparatus 1 performs processes of Steps #17 and #18 before the electronic paper 4 is removed therefrom.

Alternatively, if the user presses an "electronic paper" button on the top screen WN0 and connects the electronic paper 4 to the image forming apparatus 1 (No in #11, and Yes in #19), then the image forming apparatus 1 reads out a pair of the MFP ID and the job ID from the electronic paper 4 (#20). The image forming apparatus 1, then, obtains (#21) a summary record RA, a job details record RB or RC for the job corresponding to the job ID, and image data from another image forming apparatus 1 assigned the MFP ID, or from the subject image forming apparatus 1 in some cases.

The image forming apparatus 1 displays a screen on which conditions for the job are reflected (the conditions specifying screen WN17, WN27, or WN37, respectively shown in FIG. 23, 24, or 25) based on the obtained summary record RA and the like, so that the specified conditions are received thereon (#22 of FIG. 31). The user can change the conditions to new conditions, if necessary, and specify the resulting new conditions. The user can also retain the current conditions specified.

The image forming apparatus 1 displays a preview screen on the electronic paper 4 based on the received conditions (#23).

At this time, the image forming apparatus 1 displays the preview notifying screen WN21, WN22, WN32, WN43, or WN53 on the touchscreen 10h1, as with the process of Step #13.

The user determines whether or not to execute the job while referring to the preview screen. The user presses the "BACK" button to specify the conditions again. Responding to this operation (No in #25), the image forming apparatus 1 displays the conditions specifying screen WN11, WN21, WN31, WN41, or WN51 to receive change in the specified conditions (#22). Then, the image forming apparatus 1 displays a preview screen on the electronic paper 4 once again based on the resulting new conditions (#23).

If the user determines that the job is to be executed based on the specified conditions, then he/she presses the start key. The user may press the start key without displaying the preview screen on the electronic paper 4. Responding to this operation (Yes in #25), the image forming apparatus 1 executes the job in accordance with the specified conditions (#26).

Then, the image forming apparatus 1, if necessary, generates a summary record RA, and a job details record RB or RC indicating the job conditions, and the like, saves the same, and saves the image data used for the job (#27). The image forming apparatus 1 further, if necessary, writes a pair of the MFP ID of the subject image forming apparatus 1 and the job ID in the electronic paper 4 (#28).

Alternatively, if the image forming apparatus 1 receives a request for information on a job ID from another image forming apparatus 1 (Yes in #29), then the subject image forming apparatus 1 sends, to the other image forming apparatus 1, a summary record RA, a job details record RB or RC including the job ID, and image data associated with the job ID (#30).

If the stop key is pressed, then the image forming apparatus 1 stops the execution of the job (Yes in #14 or Yes in #24).

According to this embodiment, a user can cause the electronic paper 4 to display, for confirmation, a preview of an image to be outputted by an image forming apparatus 1, and after that, output the image to another image forming apparatus 1 more easily than is conventionally possible.

Figure 32:
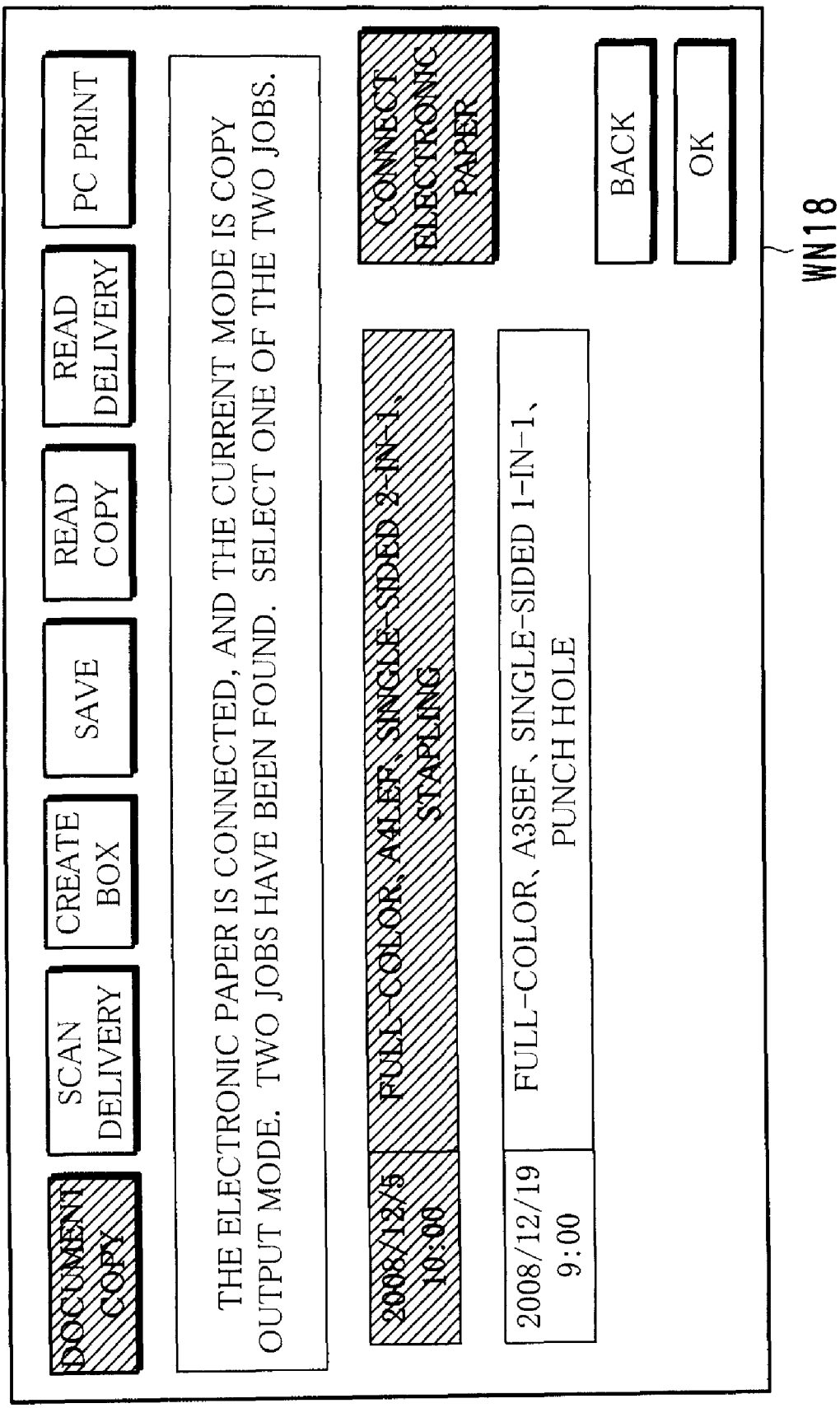
FIG. 32 is a diagram illustrating an example of a to-be-reexecuted job selecting screen.
Figure 33:
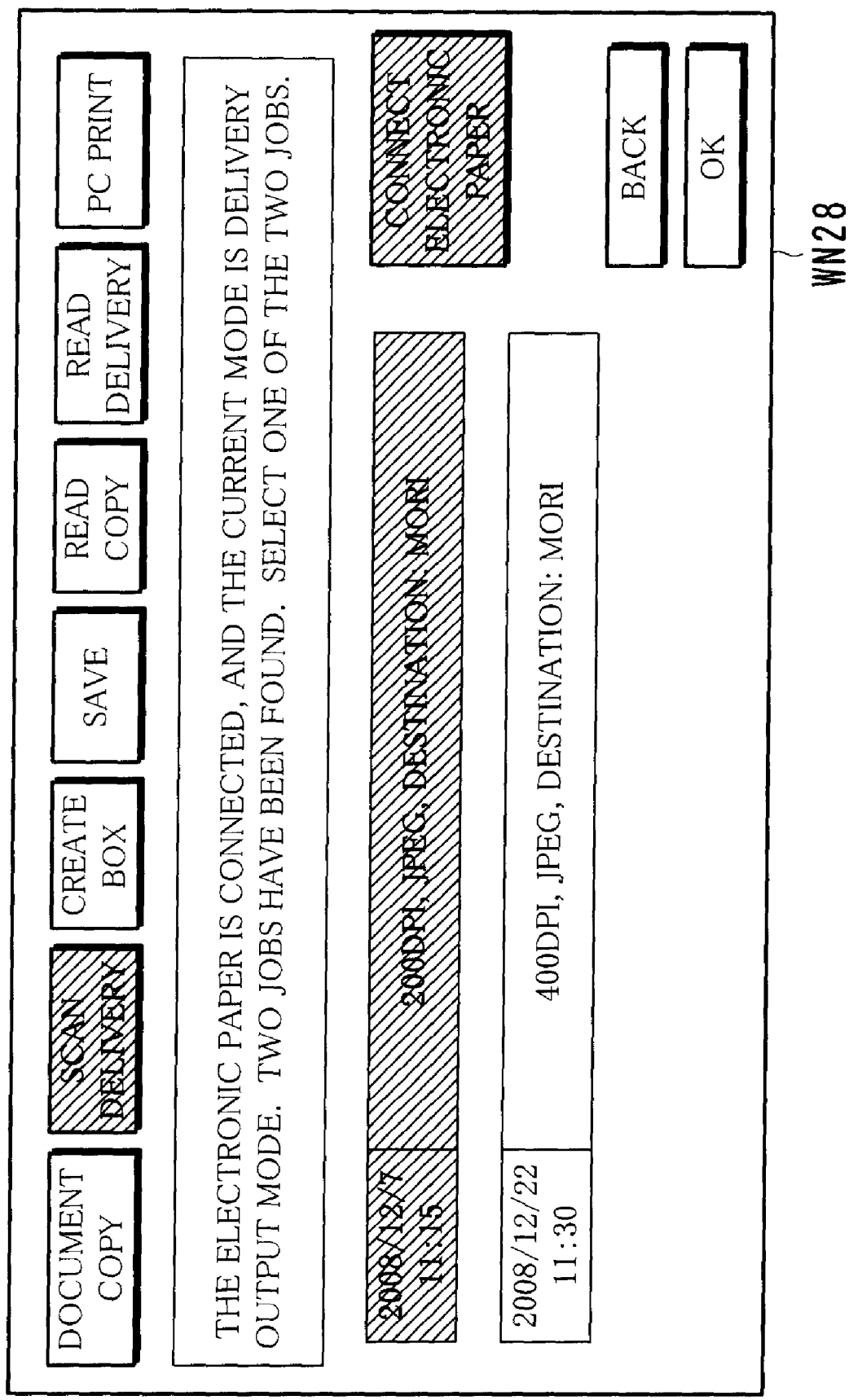
FIG. 33 is a diagram illustrating an example of a to-be-reexecuted job selecting screen.
Figure 34:
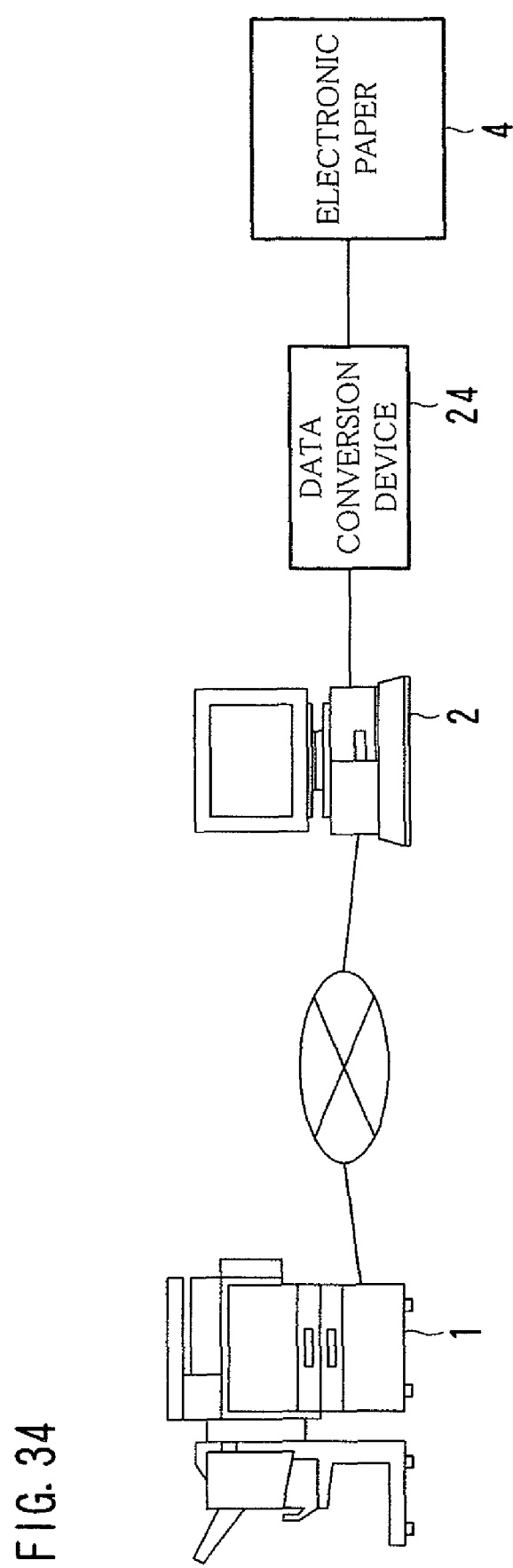
FIG. 34 is a diagram depicting a connection between a terminal and electronic paper.

FIG. 32 is a diagram illustrating an example of a to-be-reexecuted job selecting screen WN18; FIG. 33 is a diagram illustrating an example of a to-be-reexecuted job selecting screen WN28; and FIG. 34 is a diagram depicting a connection between the terminal 2 and the electronic paper 4.

A plurality of pairs of an MFP ID and a job ID may be stored in the electronic paper 4. In such a case, a user may select a pair of an MFP ID and a job ID for a job to be executed in the following manner.

The identification information acquisition processing portion 121 obtains individual pairs of an MFP ID and a job ID for individual jobs from the electronic paper 4.

The execution conditions receiving portion 102 obtains a summary record RA, a job details record RB or RC, and the like for each of the pairs from another image forming apparatus 1. The execution conditions receiving portion 102, then, displays a screen for selecting a job to be executed on the touchscreen 10h1.

In the case where, for example, two pairs for two jobs of which the type is the document copy job are read out, the to-be-reexecuted job selecting screen WN18 as shown in FIG. 32 is displayed. Alternatively, in the case where, for example, two pairs for two jobs of which the type is the scan delivery job are read out, the to-be-reexecuted job selecting screen WN28 as shown in FIG. 33 is displayed.

The execution conditions receiving portion 102, then, displays screens shown in FIGS. 23-29, and receives specified conditions.

In the embodiment discussed above, the example is described in which the electronic paper 4 is used in the image forming apparatus 1. Instead, however, the electronic paper 4 may be used in the terminal 2, for example, in the following manner.

In the case where the terminal 2 and the electronic paper 4 are provided with the same interface as each other, the terminal 2 and the electronic paper 4 are connected to each other via the interface. Otherwise, as shown in FIG. 34, a data conversion device 24 is provided between an interface of the electronic paper 4 and an interface of the terminal 2, e.g., a USB; thereby communication therebetween is established.

In the case where the user causes the terminal 2 to execute, once again, a PC print job that has been previously executed, or to execute a PC print job whose execution has been attempted, he/she connects the electronic paper 4 to the terminal 2. Responding to this operation, the terminal 2 reads out a pair of the MFP ID and the job ID, and performs the same process as that of the job data receiving portion 122. To be specific, the terminal 2 obtains, from the image forming apparatus 1 assigned the MFP ID read out, a summary record RA, a job details record RB or RC of the job corresponding to the job ID read out, and image data. The terminal 2, then, displays the conditions specifying screen WN30 (see FIG. 14) with the conditions indicated in the summary record RA, and the job details record RB or RC reflected. The user can change the conditions on the conditions specifying screen WN30 appropriately and give a command to execute the job.

The terminal 2 performs a process for executing a PC print job as with the process described earlier in "Case C". Note that, if conditions are changed to new conditions, the terminal 2 performs the process based on the new conditions. Before completing the process, the terminal 2 may display a preview screen of the PC print job on the electronic paper 4. Alternatively, the user may select an image forming apparatus 1, and the image forming apparatus 1 thus selected by the user is caused to execute the PC print job.

In this embodiment, the job history information database 141 and the scan data saving portion 143 are prepared for each image forming apparatus 1, and the image forming apparatus 1 that has executed a job manages the job record information and image data for the job. Instead, however, another configuration is possible in which the network system SY is provided with a server that collectively manages job record information and image data. Yet another configuration is possible in which job data is stored in the electronic paper 4, and the image forming apparatus 1 reads out the job data from the electronic paper 4 in order to execute a job, and uses the job data read out.

Job conditions other than those shown in FIGS. 7 and 8 may be included in the job conditions. For example, the job conditions may include the number of prints, adding a word/number such as a date, a page number, or a filing number to the header and footer, combination with a watermark or a stamp such as "urgent" or "confidential", a booklet finish, and position for binding. The present embodiment is also applicable to the case where such conditions are included in the job conditions.

The types of jobs are not limited to the five types as discussed herein. The present embodiment is also applicable, for example, to a job for sending an image by facsimile transmission.

In the embodiments discussed above, the overall configurations of the network system SY, and the image forming apparatus 1, the configurations of various portions thereof, the content to be processed, the processing order, the configuration of the database, the structure of the table, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A system for outputting an image, the system comprising:
    a first image output apparatus; and
    a second image output apparatus, wherein
    the first image output apparatus includes
        a display processing portion that displays an image to be outputted on electronic paper based on a first condition under which a job to output the image is executed,
        a conditions storing processing portion that stores, in a conditions storage portion, the first condition in association with a job identifier for identifying the job, and
        a job identifier storing processing portion that stores the job identifier in the electronic paper, and
    the second image output apparatus includes
        a reading portion that reads out the job identifier from the electronic paper,
        an obtaining portion that obtains, from the conditions storage portion, the first condition corresponding to the job identifier thus read out, and
        a job execution portion that executes a whole or a part of the job based on the first condition thus obtained.

2. The system according to claim 1, wherein
    the conditions storage portion is implemented by a storage provided in the first image output apparatus,
    the conditions storing processing portion stores, in the conditions storage portion, the first condition in association with a device identifier for identifying the first image output apparatus,
    the job identifier storing processing portion stores the job identifier together with the device identifier in the electronic paper,
    the reading portion reads out the job identifier together with the device identifier, and
    the obtaining portion obtains the first condition by connecting to the first image output apparatus based on the device identifier thus read out, requesting the first image output apparatus for a condition corresponding to the job identifier read out together with the device identifier, and receiving the condition from the first image output apparatus.

3. The system according to claim 1, wherein the conditions storage portion is implemented by a server having a function to communicate with the first image output apparatus and the second image output apparatus, or a nonvolatile memory included in the electronic paper.

4. The system according to claim 1, wherein
    the first image output apparatus further includes
        a scanning portion that scans the image depicted on first paper,
        an image data storing processing portion that stores, in an image data storage portion, image data obtained by scanning the image in association with the job identifier, and
        a first printer that prints, based on the first condition, the image thus scanned, and the second image output apparatus further includes a second printer, and
    if the job is a job to scan the image depicted on the first paper and to copy the image onto second paper, then the job execution portion executes the whole or the part of the job by causing the second printer to perform a process for using the image data stored in association with the job identifier that has been read out in the image data storage portion to print the image based on the first condition.

5. The system according to claim 1, wherein
    the first image output apparatus further includes
        a scanning portion that scans the image depicted on first paper,
        an image data storing processing portion that stores, in an image data storage portion, image data obtained by scanning the image in association with the job identifier, and
        a first transmission portion that sends the image data based on the first condition, and
    the second image output apparatus further includes a second transmission portion, and
    if the job is a job to provide the image depicted on the first paper via a communication line, then the job execution portion executes the whole or the part of the job by causing the second transmission portion to perform a process for sending, based on the first condition, the image data stored in association with the job identifier that has been read out in the image data storage portion.

6. The system according to claim 1, wherein
    the first image output apparatus further includes
        a receiving portion that receives image data of the image from a terminal,
        an image data storing processing portion that stores, in an image data storage portion, the image data thus received in association with the job identifier, and
        a first printer that uses the image data received to print the image based on the first condition, and
    the second image output apparatus further includes a second printer, and
    if the job is a job to use the image data received from the terminal to print the image onto paper, then the job execution portion executes the whole or the part of the job by causing the second printer to perform a process for using the image data stored in association with the job identifier that has been read out in the image data storage portion to print the image based on the first condition.

7. The system according to claim 4, wherein the image data storage portion is implemented by a storage included in the first image output apparatus, a server having a function to communicate with the first image output apparatus and the second image output apparatus, or a nonvolatile memory included in the electronic paper.

8. The system according to claim 1, wherein
    the first image output apparatus further includes
        a saving portion that saves image data of the image therein,
        a first printer that uses specified image data that is saved in the saving portion and is specified by a user to print the image onto paper based on the first condition, and
        an image data identifier storing processing portion that stores, in an image data identifier storage portion, an image data identifier for identifying the specified image data in association with the job identifier, and
    the second image output apparatus further includes a second printer, and
    if the job is a job to use the specified image data to print the image onto paper, then the job execution portion executes the whole or the part of the job by obtaining, from the first image output apparatus, the specified image data based on the image data identifier stored in association with the job identifier that has been read out in the image data identifier storage portion, and causing the second printer to perform a process for using the specified image data to print the image based on the first condition.

9. The system according to claim 1, wherein the first image output apparatus further includes
a saving portion that saves image data of the image therein,
a first transmission portion that sends, based on the first condition, specified image data that is saved in the saving portion and is specified by a user, and
an image data identifier storing processing portion that stores, in an image data identifier storage portion, an image data identifier for identifying the specified image data in association with the job identifier, and
the second image output apparatus further includes a second transmission portion, and
if the job is a job to provide the specified image data via a communication line, then the job execution portion executes the whole or the part of the job by obtaining, from the first image output apparatus, the specified image data based on the image data identifier stored in association with the job identifier that has been read out in the image data identifier storage portion, and causing the second transmission portion to perform a process for sending the specified image data based on the first condition.

10. The system according to claim 1, wherein the second image output apparatus further includes
a conditions displaying portion that displays the first condition obtained by the obtaining portion,
an operating portion for a user to change the first condition thus displayed, and
a receiving portion that receives, as a second condition, a condition obtained by changing the first condition by the user, and
if the receiving portion receives the second condition, then the job execution portion executes the whole or the part of the job based on the second condition.

11. The system according to claim 1, wherein the second image output apparatus further includes a message displaying portion that displays, if it is impossible to execute the whole or the part of the job based on the first condition, a message indicating that the whole or the part of the job are not carried out based on the first condition.

12. A system for outputting an image, the system comprising:
a first image output apparatus;
a second image output apparatus; and
a terminal, wherein
the first image output apparatus includes
a display processing portion that displays an image to be outputted by the first image output apparatus on electronic paper based on a first condition under which a job to output the image is executed,
a conditions storing processing portion that stores, in a conditions storage portion, the first condition in association with a job identifier for identifying the job, and
a job identifier storing processing portion that stores the job identifier in the electronic paper, and
the terminal includes
an inputting portion that inputs the job identifier stored in the electronic paper, and
a command portion that gives a command to the second image output apparatus to execute a whole or a part of the job based on the first condition corresponding to the job identifier thus inputted, and
the second image output apparatus includes a job execution portion that executes the whole or the part of the job based on the command given by the terminal.

13. An apparatus for outputting an image, the apparatus comprising:
a display processing portion that displays an image to be outputted on electronic paper based on a first condition under which a job to output the image is executed;
a conditions storing processing portion that stores, in a conditions storage portion, the first condition in association with a job identifier for identifying the job;
a job identifier storing processing portion that stores the job identifier in the electronic paper;
a reading portion that reads out the job identifier from the electronic paper;
an obtaining portion that obtains, from the conditions storage portion, the first condition corresponding to the job identifier thus read out; and
a job execution portion that executes a whole or a part of the job based on the first condition thus obtained.

14. A method for outputting an image, the method comprising:
a first step of causing a first image output apparatus to perform a process for displaying an image to be outputted on electronic paper based on a first condition under which a job to output the image is executed by printing the image onto paper or sending data of the image;
a second step of causing the first image output apparatus to perform a process for storing, in a conditions storage portion, the first condition in association with a job identifier for identifying the job;
a third step of causing the first image output apparatus to perform a process for storing the job identifier in the electronic paper;
a fourth step of causing a second image output apparatus to perform a process for reading out the job identifier stored in the electronic paper; and
a fifth step of causing the second image output apparatus to execute a whole or a part of the job based on the first condition corresponding to the job identifier thus read out.

15. A method for outputting an image, the method comprising:
a first step of causing a first image output apparatus to perform a process for displaying an image to be outputted by the first image output apparatus on electronic paper based on a first condition under which a job to output the image is executed;
a second step of causing the first image output apparatus to perform a process for storing, in a conditions storage portion, the first condition in association with a job identifier for identifying the job;
a third step of causing the first image output apparatus to perform a process for storing the job identifier in the electronic paper;
a fourth step of causing a terminal to perform a process for obtaining the job identifier stored in the electronic paper;
a fifth step of causing the terminal to perform a process for giving a command to the second image output apparatus to execute a whole or a part of the job based on the first condition corresponding to the job identifier thus obtained; and a sixth step of causing the second image output apparatus to execute the whole or the part of the job based on the command given by the terminal.

16. A non-transitory computer-readable storage medium storing thereon a computer program used in an apparatus for outputting an image, the computer program causing the apparatus to perform:

a process for displaying an image to be outputted on electronic paper based on a first condition under which a job to output the image is executed;

a process for storing, in a conditions storage portion, the first condition in association with a job identifier for identifying the job;

a process for storing the job identifier in the electronic paper;

a process for reading out the job identifier from the electronic paper;

a process for obtaining, from the conditions storage portion, the first condition corresponding to the job identifier thus read out; and a process for executing a whole or a part of the job based on the first condition thus obtained.

* * * * *